United States Patent
Takemoto

(10) Patent No.: US 10,432,630 B2
(45) Date of Patent: Oct. 1, 2019

(54) INFORMATION PROCESSING APPARATUS, RECORDING MEDIUM, AND COMMUNICATION CONTROLLING METHOD

(71) Applicant: Yuji Takemoto, Tokyo (JP)

(72) Inventor: Yuji Takemoto, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 512 days.

(21) Appl. No.: 15/228,023

(22) Filed: Aug. 4, 2016

(65) Prior Publication Data

US 2017/0054727 A1    Feb. 23, 2017

(30) Foreign Application Priority Data

Aug. 18, 2015  (JP) .................... 2015-161141

(51) Int. Cl.
*H04L 29/06*    (2006.01)
*H04L 12/46*    (2006.01)
(Continued)

(52) U.S. Cl.
CPC .......... *H04L 63/10* (2013.01); *H04L 12/1822* (2013.01); *H04L 12/4675* (2013.01);
(Continued)

(58) Field of Classification Search
CPC ..... H04L 63/10; H04L 63/0876; H04L 63/08; H04L 12/4675; H04L 12/1822;
(Continued)

(56) References Cited

U.S. PATENT DOCUMENTS 6,898,436 B2 * 5/2005 Crockett ................. H04L 63/30
                                                              455/416
7,130,282 B2 * 10/2006 Black .................... H04L 12/1822
                                                              370/296
(Continued)

FOREIGN PATENT DOCUMENTS

JP    2006-012085    1/2006
JP    2009-089396    4/2009
(Continued)

OTHER PUBLICATIONS

Japanese Office Action dated Nov. 15, 2016.
(Continued)

*Primary Examiner* — Ayoub Alata

(74) *Attorney, Agent, or Firm* — Harness, Dickey & Pierce, P.L.C.

(57) ABSTRACT

An information processing apparatus for connection to a first network and to a second network is disclosed. The information processing apparatus includes a storage unit storing device information in which a device connected to the first network is registered; an authentication unit authenticating an information terminal connected to the second network and registering identification information about the information terminal in registration information responsive to successful authentication of the information terminal; a transition request receiving unit receiving, from the second network, a request for transition to a communication controlled state; and a communication controller restricting information transmission from the second network to the first network in an event of the transition to the communication controlled state made upon receipt of the request, while the communication controller allows, in that event, the information terminal registered in the registration information to transmit information to the device registered in the device information.

19 Claims, 24 Drawing Sheets

(51) Int. Cl.

| | | |
|---|---|---|
| *H04W 12/06* | (2009.01) | |
| *H04L 12/18* | (2006.01) | |
| *H04W 12/00* | (2009.01) | |
| *H04W 12/08* | (2009.01) | |
| *H04W 84/12* | (2009.01) | |

(52) U.S. Cl.
CPC ....... *H04L 63/0876* (2013.01); *H04W 12/003* (2019.01); *H04W 12/06* (2013.01); *H04W 12/00512* (2019.01); *H04W 12/08* (2013.01); *H04W 84/12* (2013.01)

(58) Field of Classification Search
CPC ... H04W 12/06; H04W 12/003; H04W 12/08; H04W 84/12; H04W 12/00512
See application file for complete search history.

(56) References Cited

U.S. PATENT DOCUMENTS

| | | | |
|---|---|---|---|
| 7,880,915 | B2 | 2/2011 | Takemoto |
| 8,045,228 | B2 | 10/2011 | Takemoto |
| 8,089,643 | B2 | 1/2012 | Takemoto |
| 8,237,965 | B2 | 8/2012 | Takemoto |
| 9,244,149 | B2 | 1/2016 | Piersol et al. |
| 2002/0061760 | A1* | 5/2002 | Maggenti ............ H04L 63/0428 455/518 |
| 2002/0173327 | A1* | 11/2002 | Rosen .................... H04M 3/42 455/518 |
| 2005/0287998 | A1 | 12/2005 | Tonouchi |
| 2007/0041045 | A1* | 2/2007 | Sato .................... H04N 1/4406 358/1.15 |
| 2008/0256355 | A1 | 10/2008 | Takemoto |
| 2011/0270922 | A1 | 11/2011 | Jones et al. |
| 2012/0239830 | A1* | 9/2012 | Sugimura ................ G06F 3/14 710/29 |
| 2013/0170402 | A1 | 7/2013 | Manyakin, Jr. et al. |
| 2014/0019499 | A1 | 1/2014 | Arai |
| 2014/0273864 | A1 | 9/2014 | Arai |
| 2014/0333948 | A1 | 11/2014 | Hashimoto |
| 2014/0333963 | A1 | 11/2014 | Nakamura |
| 2015/0036056 | A1 | 2/2015 | Ogawa |
| 2015/0077782 | A1 | 3/2015 | Asai |

FOREIGN PATENT DOCUMENTS

| | | |
|---|---|---|
| JP | 2010061562 A | 3/2010 |
| JP | 2012213144 A | 11/2012 |
| JP | 2014067249 A | 4/2014 |
| JP | 2014199656 A | 10/2014 |

OTHER PUBLICATIONS

Extended European Search report dated Jan. 9, 2017.
Office Action for U.S. Appl. No. 15/237,067 dated May 17, 2018.
Office Action for U.S. Appl. No. 15/291,581 dated May 24, 2018.
Extended European Search Report dated Feb. 3, 2017.
Office Action for U.S. Appl. No. 15/237,067 dated Sep. 12, 2018.
U.S. Office Action in corresponding U.S. Appl. No. 15/291,581 dated Jan. 31, 2017.
U.S. Office Action issued in U.S. Appl. No. 15/237,067 dated Nov. 17, 2017.
Notice of Rejection dated Jun. 25, 2019, issued in corresponding Japanese Patent Application No. JP2017-039715.

* cited by examiner

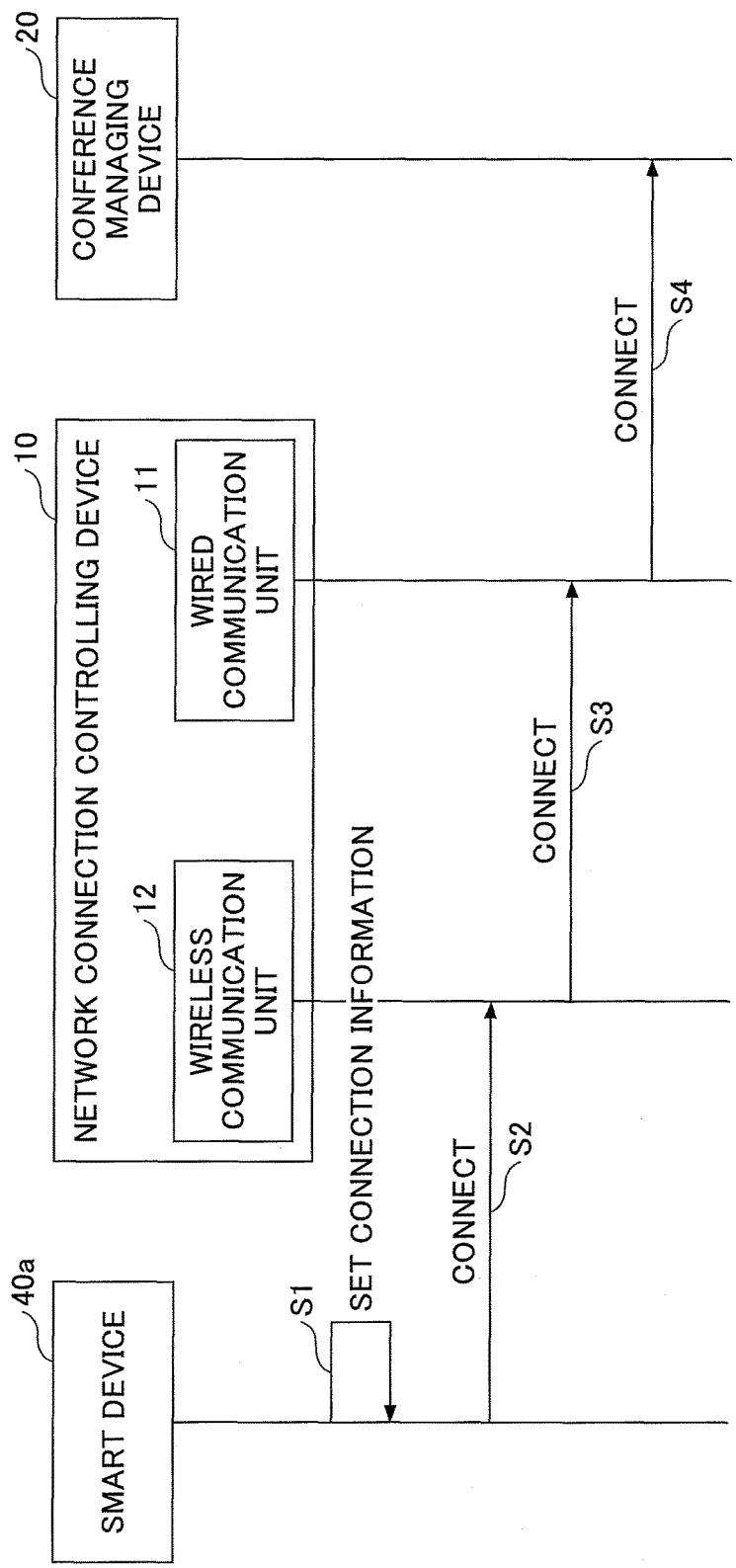

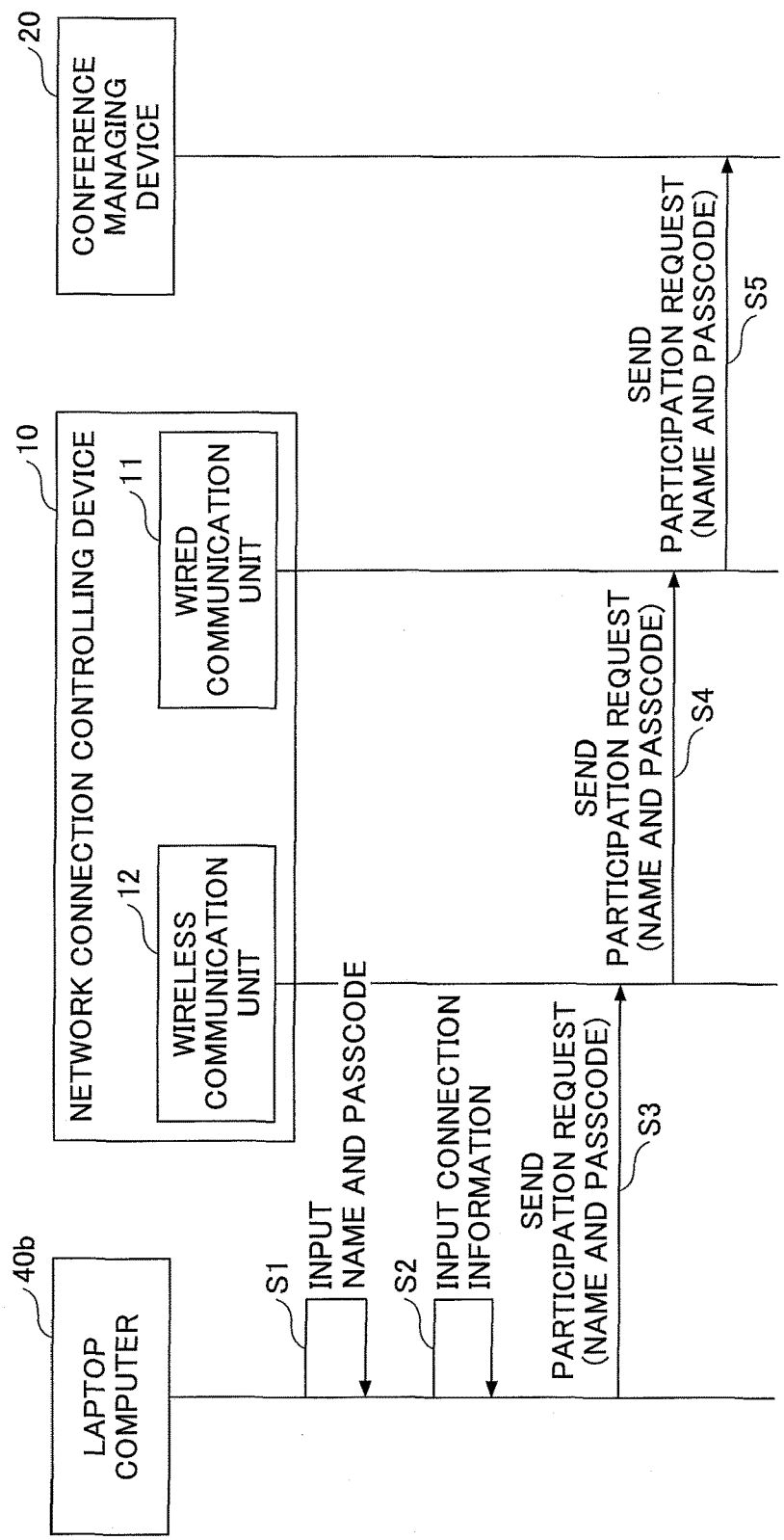

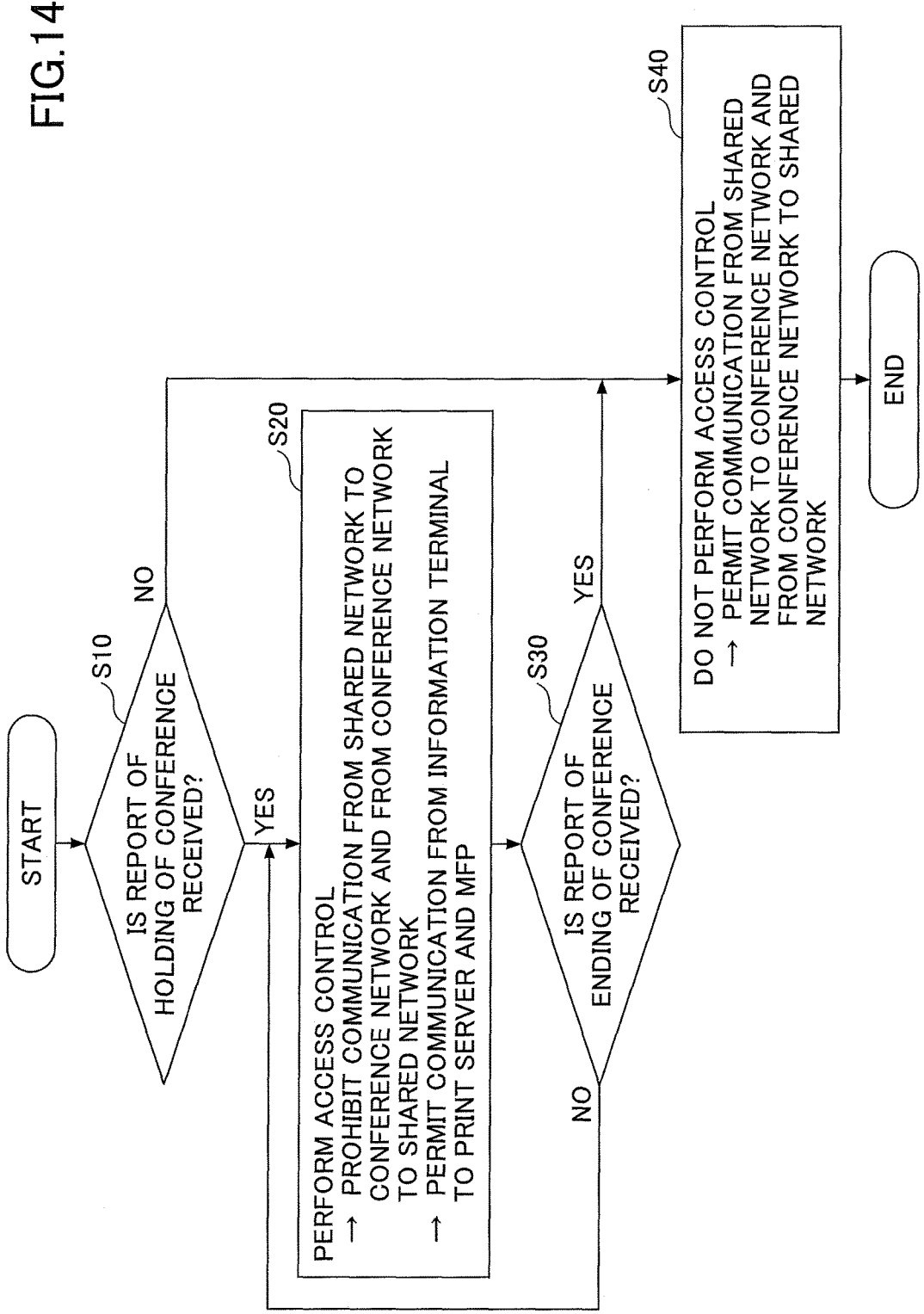

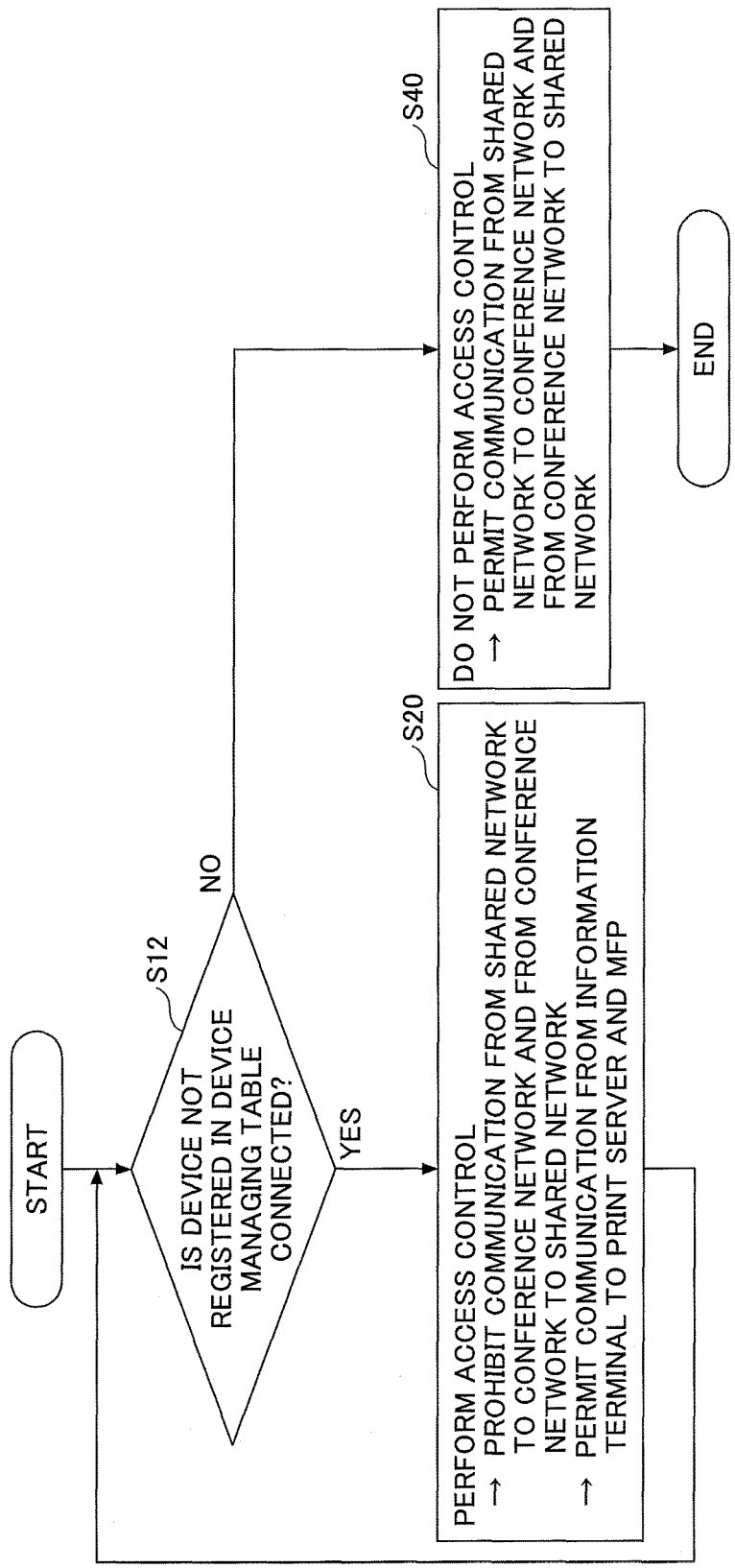

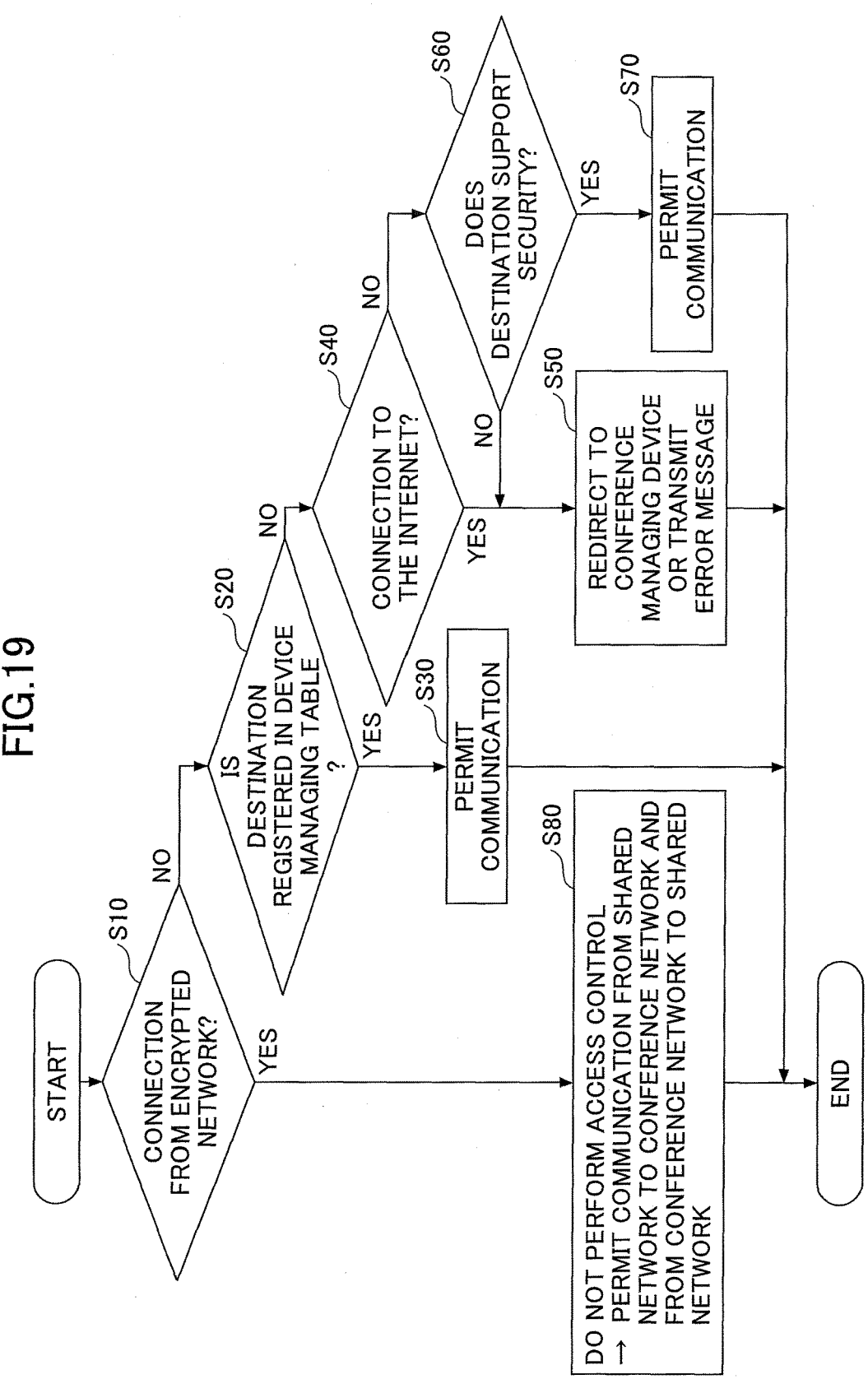

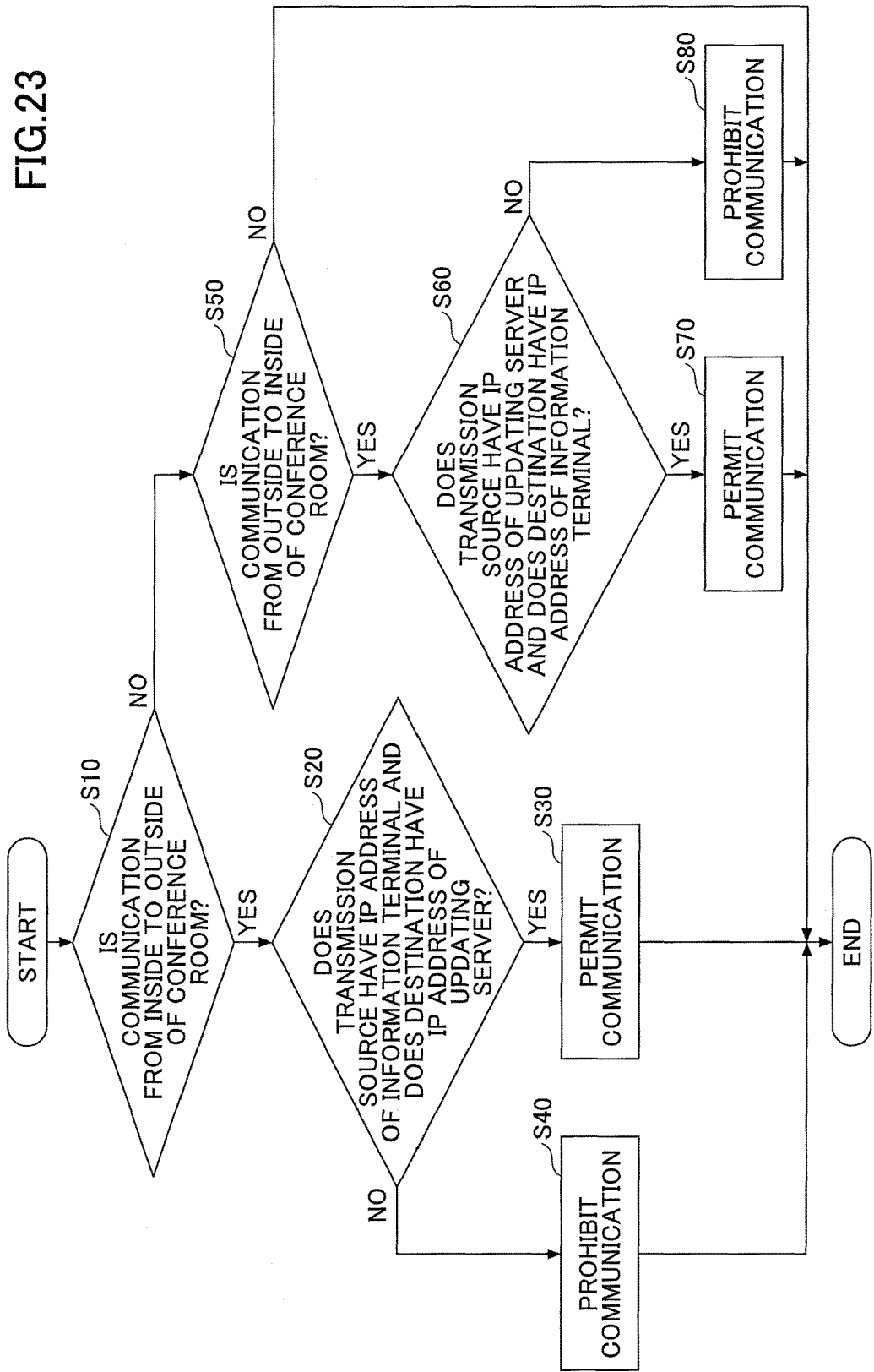

INFORMATION PROCESSING APPARATUS, RECORDING MEDIUM, AND COMMUNICATION CONTROLLING METHOD

CROSS-REFERENCE TO RELATED APPLICATIONS

The present application claims priority under 35 U.S.C. § 119 to Japanese Patent Application No. 2015-161141, filed Aug. 18, 2015. The contents of which are incorporated herein by reference in their entirety.

BACKGROUND OF THE INVENTION

1. Field of the Invention

The present invention relates to an information processing apparatus, a recording medium, and a communication controlling method.

2. Description of the Related Art

There are conference systems implemented when participants of a conference communicate with a server via a network from respective mobile information terminals in order to share conference materials or to utilize a printer, a projector, an electronic whiteboard, or the like.

In the conference system, because participants can access confident conference materials, some access control may be performed when the participants access the materials (see Patent Document 1, for example). Patent Document 1 discloses a conference support system including a router that performs packet filtering, in which a mobile terminal is caused to connect with a Virtual Local Area Network (VLAN) based on information that indicates belonging transmitted by the mobile terminal and the packet filtering is performed based on the VLAN of the mobile terminal.

RELATED ART DOCUMENTS

[Patent Document 1] Japanese Unexamined Patent Application Publication No. 2006-012085

SUMMARY OF THE INVENTION

In an embodiment, there is provided an information processing apparatus for connection to a first network and to a second network. The information processing apparatus includes a storage unit configured to store device information in which a device connected to the first network is registered; an authentication unit configured to authenticate an information terminal connected to the second network based on authentication information transmitted from the information terminal and to register identification information about the information terminal in registration information in response to successful authentication of the information terminal; a transition request receiving unit configured to receive, from the second network, a request for transition to a communication controlled state; and a communication controller configured to restrict transmission of information from the second network to the first network in an event of the transition to the communication controlled state, the transition to the communication controlled state being made upon receipt of the request by the transition request receiving unit, while the communication controller allows, in the event of the transition to the communication controlled state, the information terminal registered in the registration information to transmit information to the device that is registered in the device information.

BRIEF DESCRIPTION OF THE DRAWINGS

Other objects and further features of embodiments will become apparent from the following detailed description when read in conjunction with the accompanying drawings, in which:

FIG. 9A is a sequence diagram depicting a procedure by which an information terminal is connected to a network connection controlling device according to an embodiment of the present invention;

FIG. 9B is a sequence diagram depicting a procedure by which an information terminal is connected to a network connection controlling device according to an embodiment of the present invention;

FIG. 14 is a flowchart depicting a procedure by which a network connection controlling device performs access control according to an embodiment of the present invention;

FIG. 15 is a flowchart depicting a procedure by which a network connection controlling device performs access control (variation) according to an embodiment of the present invention;

FIG. 19 is a flowchart depicting a procedure by which a network connection controlling device performs access control according to an embodiment of the present invention (Example 2);

FIG. 23 is a flowchart depicting a procedure by which a network connection controlling device performs access control according to an embodiment of the present invention (Example 4).

DESCRIPTION OF THE EMBODIMENTS

In the following, embodiments of the present invention will be described in detail with reference to the accompanying drawings.

It is a general object of the present invention to provide an information processing apparatus capable of enabling a terminal of a participant to communicate with a device outside a network and preventing deterioration of security.

Example 1

Schematic Structure of Communication System

Figure 1A:
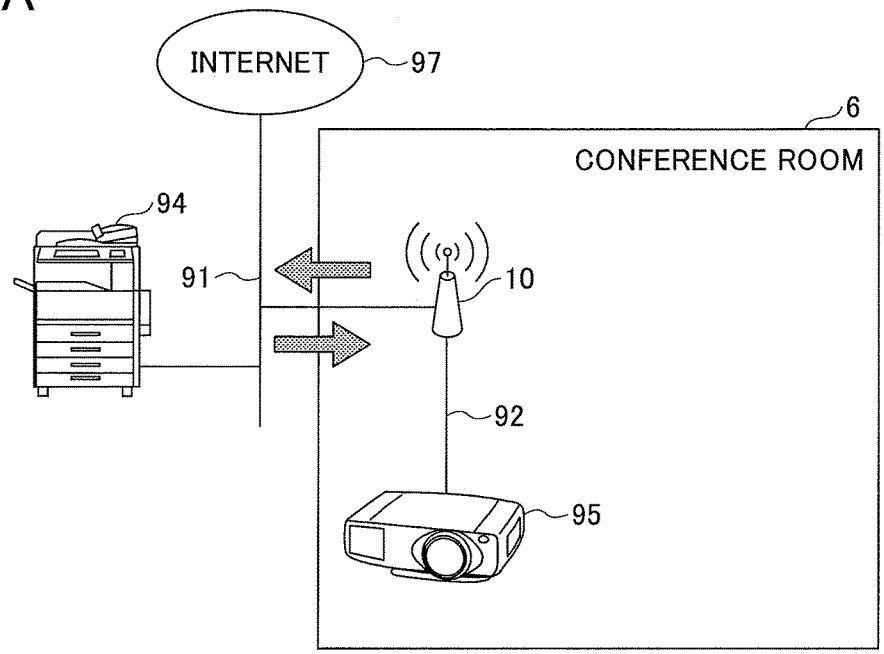
FIG. 1A is a diagram schematically illustrating an operation of a communication system according to an embodiment of the present invention.
Figure 1B:
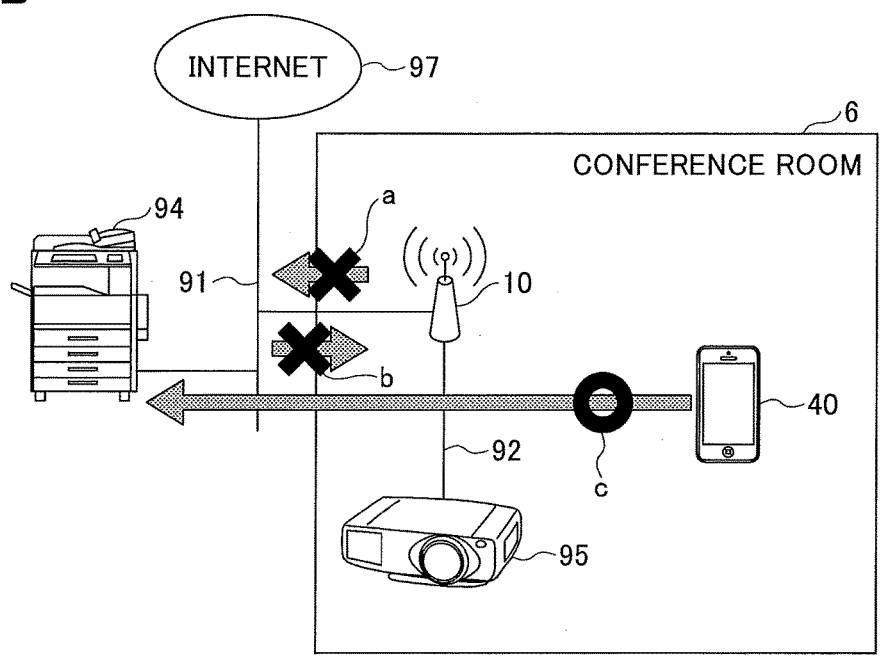
FIG. 1B is a diagram schematically illustrating an operation of a communication system according to an embodiment of the present invention.

FIGS. 1A and 1B are diagrams illustrating operations of a communication system 100 according to an embodiment of the present invention. FIG. 1A schematically depicts a system configuration. A network connection controlling device 10 and a projector 95 connected via a conference network 92 are disposed in a conference room 6. Further, a Multifunction Peripheral/Printer/Product (MFP) 94 is connected to the network connection controlling device 10 via a shared network 91.

As illustrated in FIG. 1A, if an information terminal 40 of an attendee of a conference is not connected to the network connection controlling device 10, the network connection controlling device 10 permits outgoing communication from the conference room 6 and incoming communication from the outside.

Then, it is assumed that a conference is held. When the conference is held, the information terminal 40 is enabled to access conference materials. As illustrated in FIG. 1B, the information terminal 40 of an attendee of the conference is connected to the network connection controlling device 10. The network connection controlling device 10 limits communication performed by the information terminal 40 as follows.

a. Communication from a conference network 92 side to the shared network 91 is basically prohibited.

b. Communication from a shared network 91 side to the conference network 92 is basically prohibited.

c. Communication of the information terminal 40 with a specified device such as the MFP 94 determined in advance is exceptionally permitted.

In addition, when the conference ends, the network connection controlling device 10 returns to access control of FIG. 1A.

Accordingly, the communication system 100 of this embodiment can prevent conference materials or the like from being leaked outside or being browsed from the outside by disposing the network connection controlling device 10 between the conference network 92 and the shared network 91. Further, the information terminal 40 can access the MFP 94 disposed outside the conference room 6 and used for the conference. Further, there is no need to build a VLAN.

Further, because access control is linked with the holding and the ending of the conference, an attendee can determine whether communication with the outside is permitted by only considering the holding and the ending of the conference, so that it is possible to improve usability of the conference.

<As to Terms>

In the following, terms used in this embodiment are described.

Host: a person who performs an operation to start a conference. In addition to the starting of the conference, the host can hold the conference, permit participation in the conference, suspend the conference, and remove a participant, for example.

Participant: a person who participates in a conference other than the host. The participant can exit.

Attendee: the host and the participant are simply called attendees if they are not distinguished.

Location: a place where a participant is present or participants gather. For example, if a conference is held in a single conference room 6 (as will be described in FIG. 2), the location corresponds to this conference room 6. If the singe conference room 6 cannot accommodate participants, each of conference rooms is called a corresponding location. Further, if a conference is held at geographically remote places, each of the geographically remote places is called a corresponding location. If a single conference is held in separate conference rooms, a conference managing device 20 (to be described later) in each of the separate conference rooms performs communication to transmit and receive an image to be projected by the projector 95 or an image to be displayed by an electronic whiteboard 96. Accordingly, attendees of the separate conference rooms can see the same image.

Starting a conference: registration of a conference such as issuing a passcode.

Participation: logging into the conference managing device 20 by the information terminal 40 using a passcode.

Holding a conference: one of operations performed by the host. In accordance with this, the information terminal 40 can access conference materials or a device (such as the shared network 91 or the conference network 92).
In addition, a conference may be automatically held in response to participation.

Ending a conference: one of operations performed by the host. In accordance with this, the information terminal 40 cannot access conference materials or the device.

<System Configuration>

Figure 2:
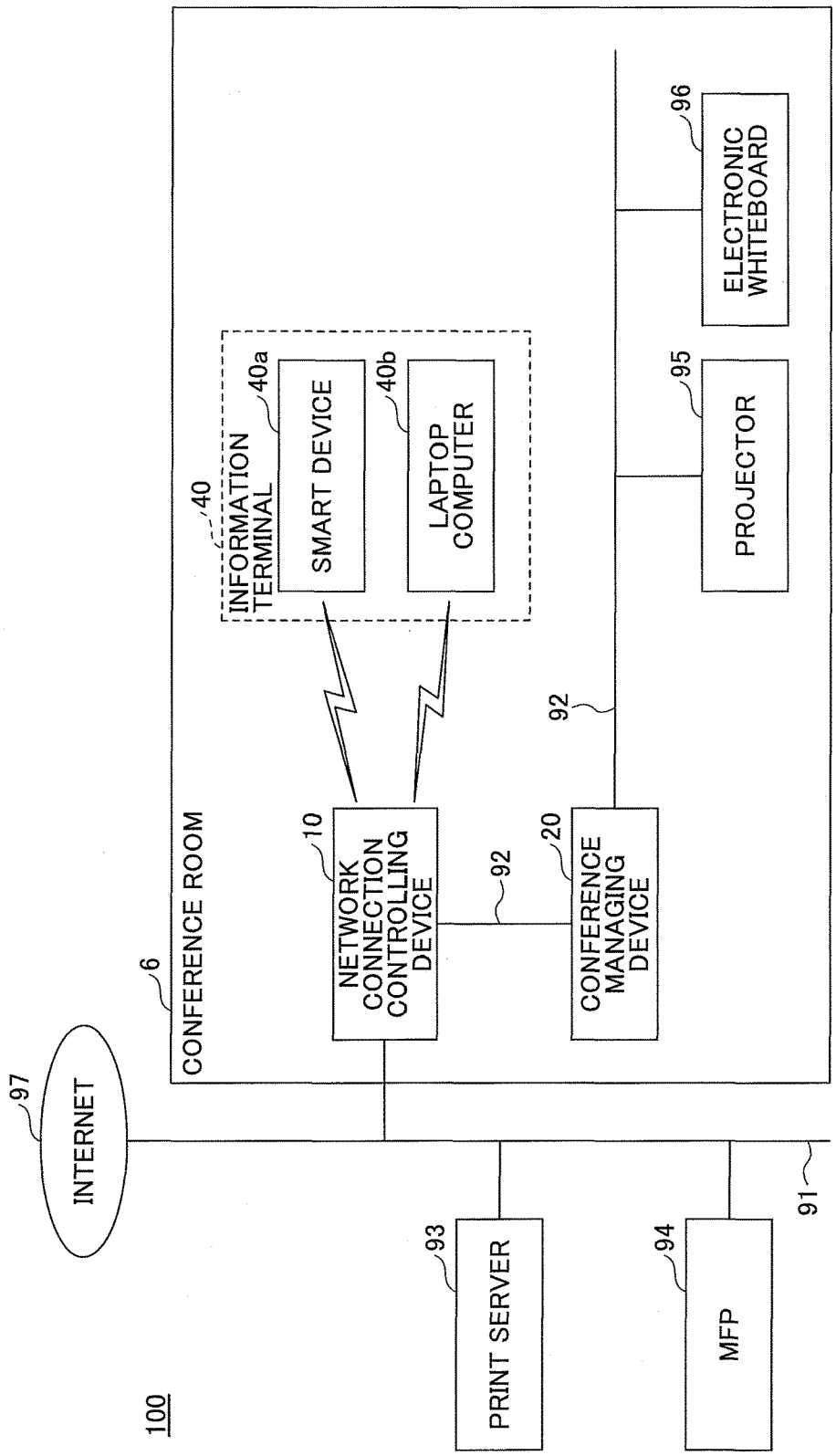
FIG. 2 is a schematic configuration diagram of a communication system according to an embodiment of the present invention.

FIG. 2 is a schematic configuration diagram of the communication system 100 according to the embodiment of the present invention. The communication system 100 mainly includes the conference network 92 and the shared network 91. The conference network 92 is built in the conference room 6 and the shared network 91 is built outside the conference room 6 and is connected to the Internet 97, for example. Both of the conference network 92 and the shared network 91 may be a Local Area Network (LAN) but each may further include a plurality of LANs. Further, the conference network 92 and the shared network 91 may be wirelessly constructed.

A smart device 40*a* and a laptop computer 40*b* are examples of the information terminal 40. The information terminal 40 wirelessly communicates with the network connection controlling device 10. The information terminal 40 may have a function of wired communication. The information terminal 40 is used to refer to conference materials or operate a device. Further, the information terminal 40 is used for display of a participant list, a removal or exit operation, and the like.

The information terminal 40 may be the smart device 40*a* or the laptop computer 40*b*. These are only examples. The reason for presenting two types of devices as the information terminal 40 is that there are various communication methods installed on the information terminal 40. In this embodiment, the smart device 40*a* can perform wireless communication in at least two communication methods and the laptop computer 40*b* can perform wireless communication in one communication method as an example of description.

One communication method of the smart device 40*a* is a communication method capable of communicating minimum information in a simplified manner while the communication method is not suitable for high-speed communication. Examples of such a communication method include Bluetooth (registered trademark), Near Field Communication (NFC) (registered trademark), Zigbee (registered trademark), and infrared communication. Examples of another communication method of the smart device 40*a* include a wireless LAN, mobile phone communication, and Worldwide Interoperability for Microwave Access (WiMAX), which are suitable for high-speed communication.

In the following description, it is assumed that the smart device 40*a* communicates with the conference managing device 20 via an application and the laptop computer 40*b* communicates with the conference managing device 20 via a browser. This is also for convenience sake of description. The smart device 40*a* may communicate via a browser or the laptop computer 40*b* may communicate via an application.

The smart device 40*a* is a general term of an information processing apparatus configured to be easily portable for a user. The smart device 40*a* may be a smartphone (multi-function phone terminal) having a phone function, a tablet computer focusing on information processing, or the like. Other examples of the smart device 40*a* include a wearable terminal (heads-up display, wristwatch terminal, and the like), a mobile phone, a Personal Digital Assistant (PDA), a digital camera, and the like. However, the smart device 40*a* is not limited to these devices. The laptop computer 40*b* refers to a small Personal Computer (PC) such as a notebook or a laptop. As described above, the difference between the smart device 40*a* and the laptop computer 40*b* is only for convenience sake of description.

A print server 93 and the MFP 94 connected to the shared network 91 are examples of devices that are frequently used at a conference. The print server 93 and the MFP 94 may be located within the conference room 6.

The projector 95 and the electronic whiteboard 96 connected to the conference network 92 are examples of devices disposed in the conference room 6 and frequently used at a conference. The projector 95 is used by an attendee to project conference materials, for example. The electronic whiteboard 96 is used to display the conference materials or display handwriting information indicating handwriting of the attendee. In addition, a printer, a FAX machine, a copier, or the like may be disposed as a device in the conference room 6. Further, the devices are not necessarily required to hold a conference. The projector 95, the electronic whiteboard 96, and the MFP 94 may simply be referred to as a "device" if not differentiated.

The network connection controlling device 10 has functions of a communication interface and an access point of a wireless LAN for the information terminal 40 to perform wireless communication and a function of a router that controls data exchange between the conference network 92 and the shared network 91. Further, the network connection controlling device 10 has a function of limiting communication with the conference managing device 20 performed by the information terminal 40.

The conference managing device 20 controls the network connection controlling device 10, saves or deletes conference materials, performs input or output to a device, and manages attendees at a conference, for example. Further, the conference managing device 20 has a function of a Web server for the information terminal 40. Specifically, the conference managing device 20 authenticates participants via a passcode, registers participant information, sends a report that a conference is held to the network connection controlling device 10, transmits a participant list to the information terminal 40, and receives removal of an unscheduled participant, for example.

The network connection controlling device 10, the conference managing device 20, the projector 95, and the electronic whiteboard 96 are disposed in a single conference room 6. If there is a plurality of conference rooms 6, the network connection controlling device 10, the conference managing device 20, the projector 95, and the electronic whiteboard 96 are disposed in each conference room 6.

Further, if another conference room 6 is connected via the Internet 97 or the shared network 91, the other conference room 6 and the conference room 6 illustrated in FIG. 2 may belong to the same conference. In this case, information terminals 40 in the two conference rooms 6 can access corresponding conference managing devices 20 and refer to conference materials, for example.

<Hardware Configuration>

<<Conference Managing Device 20>>

Figure 3:
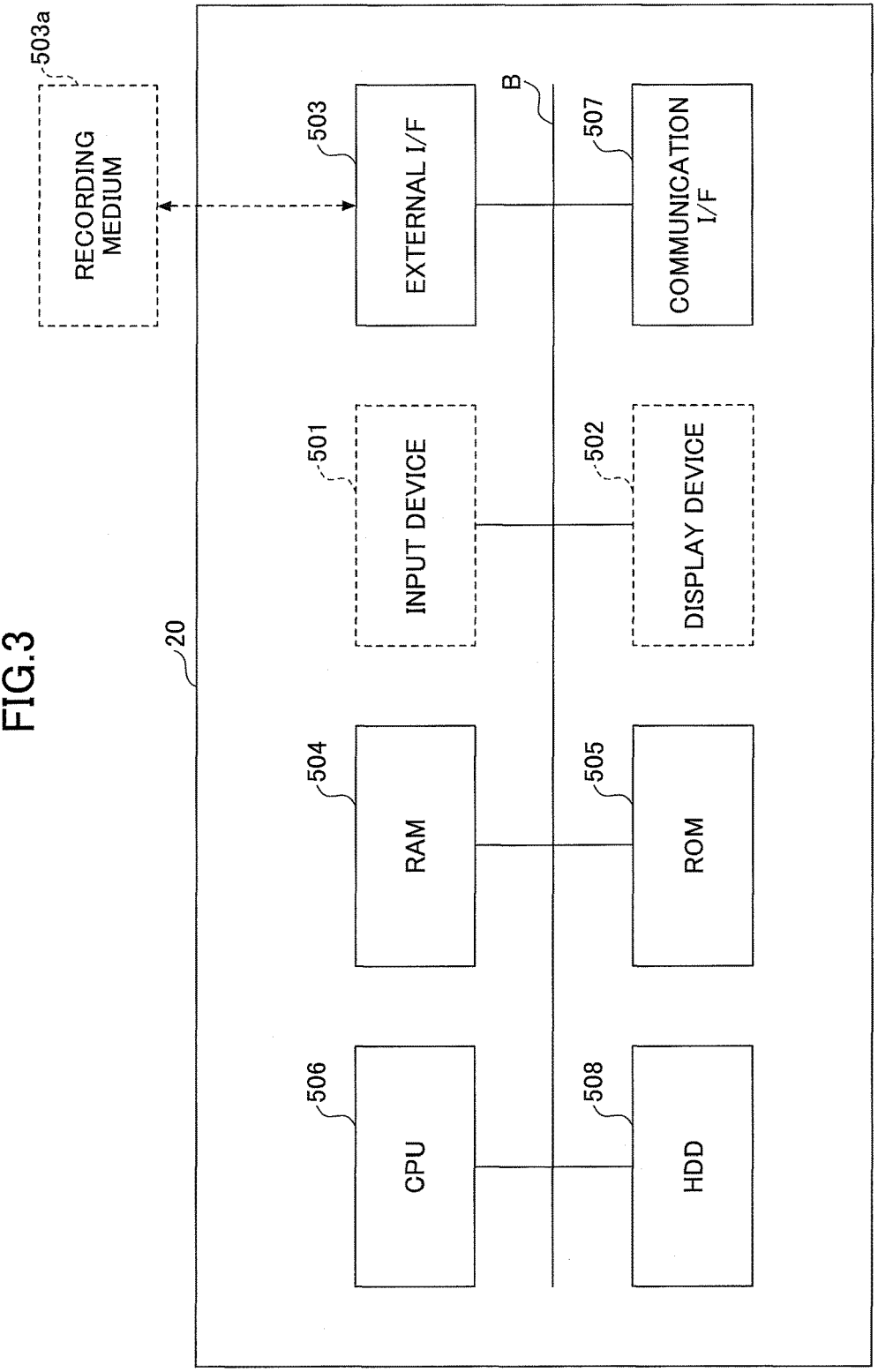
FIG. 3 is a hardware configuration diagram of a conference managing device according to an embodiment of the present invention.

FIG. 3 is a hardware configuration diagram of the conference managing device 20 according to the embodiment of the present invention. The conference managing device 20 includes an input device 501, a display device 502, an external interface (I/F) 503, a RAM 504, a ROM 505, a CPU 506, a communication I/F 507, a Hard Disk Drive (HDD) 508, and the like. These elements are interconnected via a bus B. In addition, the input device 501 and the display device 502 may be connected and used when necessary.

The input device 501 includes a keyboard, a mouse, a touch panel, and the like. The input device 501 is used by the user to input an operation signal. The display device 502 includes a display screen and the like. The display device 502 displays a result of processing performed by the conference managing device 20.

The communication I/F 507 is an interface to connect the conference managing device 20 to various types of networks. In accordance with this, the conference managing device 20 can perform data communication via the communication I/F 507.

The HDD 508 is an example of a non-volatile storage device that stores a program and data. Examples of the program and data to be stored include an Operating System (OS) which is basic software to control the whole part of the conference managing device 20, application software (hereafter simply called "application") that provides various types of functions on the OS, and the like. In addition, the conference managing device 20 may employ a drive device (such as a Solid State Drive (SSD)) using a flash memory as a recording medium instead of the HDD 508.

The external I/F 503 is an interface for an external device. Examples of the external device include a recording medium 503a. In accordance with this, the conference managing device 20 can read from or write into the recording medium 503a via the external I/F 503. Examples of the recording medium 503a include a flexible disk, a CD, a DVD, an SD card, a USB memory, and the like.

The ROM 505 is an example of a non-volatile semiconductor memory (storage device) that can hold a program and data even in a powered-off state. The ROM 505 stores a Basic Input-Output System (BIOS) executed when the conference managing device 20 starts up, OS settings, a program such as network settings, data, and the like. The RAM 504 is an example of a volatile semiconductor memory (storage device) that temporarily holds a program and data.

The CPU 506 is an arithmetic unit that controls the whole part of the conference managing device 20 and implements functions thereof by reading out a program and data from a storage device such as the ROM 505 or the HDD 508 to the RAM 504 and executing a process.

In addition, the hardware configuration of the conference managing device 20 as illustrated in FIG. 3 does not need to be housed in a single case or provided as an integrated device. The hardware configuration indicates hardware elements that are preferably included in the conference managing device 20. Further, the physical configuration of the conference managing device 20 in this example may not be fixed in order to support cloud computing. The conference managing device 20 may be configured by dynamically coupling or disconnecting hardware resources depending on a load.

<<Smart Device 40a>>

Figure 4:
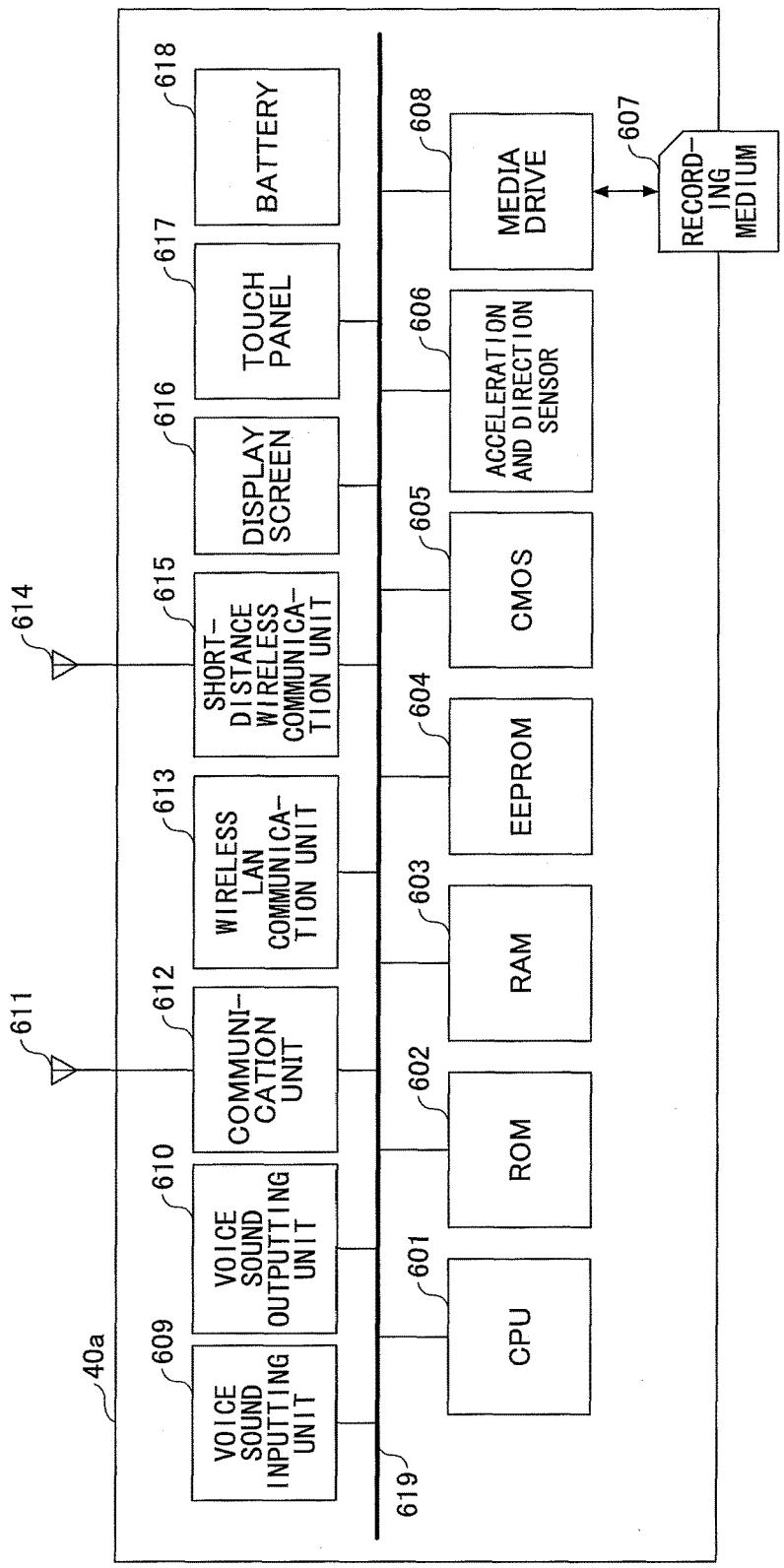
FIG. 4 is a hardware configuration diagram of a smart device according to an embodiment of the present invention.

FIG. 4 is a hardware configuration diagram of the smart device 40a according to the embodiment of the present invention. The smart device 40a in FIG. 4 includes a CPU 601, a ROM 602, a RAM 603, an Electrically Erasable Programmable Read-Only Memory (EEPROM) 604, a CMOS sensor 605, an acceleration and direction sensor 606, and a media drive 608.

The CPU 601 controls the whole part of operations of the smart device 40a. The ROM 602 stores a basic input-output program. The RAM 603 is used as a work area of the CPU 601. The EEPROM 604 reads or writes data in accordance with control of the CPU 601. The CMOS sensor 605 captures an image of a photographic subject in accordance with control of the CPU 601 and obtains image data. The acceleration and direction sensor 606 may be an electromagnetic compass that detects geomagnetism, a gyrocompass, an acceleration sensor, or the like.

The media drive 608 controls reading or writing (storing) of data from or into a recording medium 607 such as a flash memory. The media drive 608 is configured to hold the recording medium 607 in a removable manner, in which data already recorded is read out from the recording medium 607 or data is newly written and stored in the recording medium 607.

In addition, the EEPROM 604 stores an OS to be executed by the CPU 601, association information necessary for network settings, and the like. An application to execute various types of processes in the embodiment of the present invention is stored in the EEPROM 604 or the recording medium 607, for example.

Further, the CMOS sensor 605 is a charge-coupled device that converts light into an electric charge and electronically processes an image of a photographic subject. The CMOS sensor 605 may be a Charge Coupled Device (CCD) sensor, for example, as long as an image of the photographic subject can be captured.

Further, the smart device 40a also includes a voice sound inputting unit 609, a voice sound outputting unit 610, an antenna 611, a communication unit 612, a wireless LAN communication unit 613, a short-distance wireless communication antenna 614, a short-distance wireless communication unit 615, a display screen 616, a touch panel 617, and a bus line 619.

The voice sound inputting unit 609 converts voice sound into a voice sound signal. The voice sound outputting unit 610 converts a voice sound signal into voice sound. The communication unit 612 uses the antenna 611 to communicate with the nearest base station device through wireless communication signals. The wireless LAN communication unit 613 performs wireless LAN communication with an access point, the wireless LAN communication being compliant with the IEEE 802.11 standard. The short-distance wireless communication unit 615 uses the short-distance wireless communication antenna 614 to perform short-distance wireless communication.

The display screen 616 includes liquid crystal, organic EL, or the like that displays an image of a photographic subject and various types of icons. The touch panel 617 is placed on the display screen 616 and is configured with a pressure sensitive or electrostatic panel. The touch panel 617 detects a touched location on the display screen 616 in response to touch by the finger, a touch pen, or the like. The bus line 619 may be an address bus, a data bus, or the like that electrically connects the above units.

The smart device 40a includes a dedicated battery 618. The smart device 40a is driven by the battery 618. In addition, the voice sound inputting unit 609 includes a microphone for inputting voice sound. The voice sound outputting unit 610 includes a loudspeaker for outputting voice sound.

The smart device 40a can implement various types of processes to be described later in accordance with the hardware configuration illustrated in FIG. 4, for example. In addition, although hardware of the laptop computer 40b is different from the hardware of the smart device 40a in that the short-distance wireless communication unit 615 is not included, it is assumed that this difference does not have an influence on the description of this embodiment.

<<Network Connection Controlling Device>>

Figure 5:
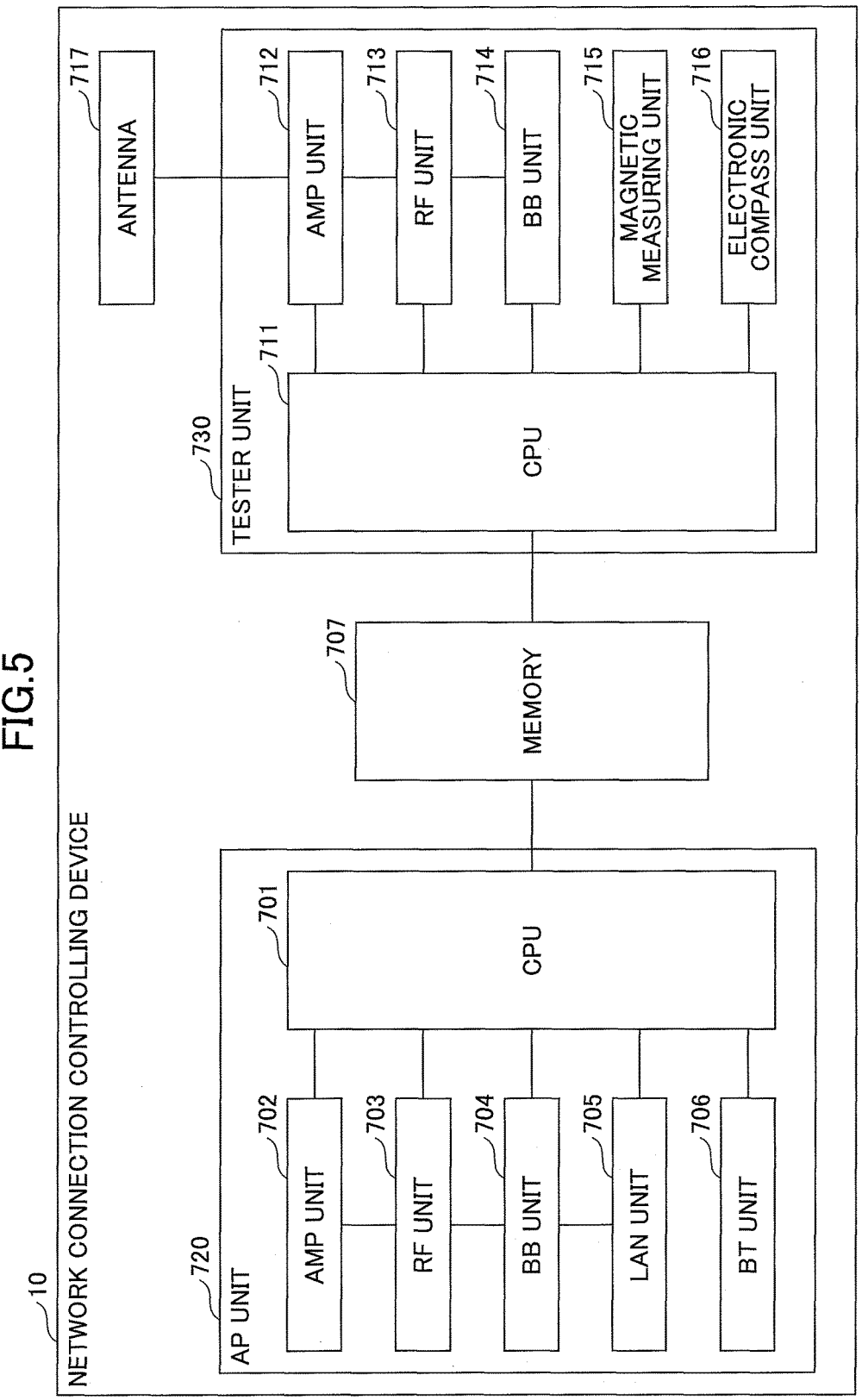
FIG. 5 is a hardware configuration diagram of a network connection controlling device according to an embodiment of the present invention.

FIG. 5 is a hardware configuration diagram of the network connection controlling device 10 according to the embodiment of the present invention. The network connection controlling device 10 includes an Access Point (AP) unit 720 that controls data communication in a normal mode, a tester unit 730 that measures a radio wave state in a measurement mode, a memory 707 that stores a Media Access Control (MAC) address of the information terminal 40 in communication and other information, and an antenna 717. The measurement mode is a mode for measuring a radio wave state. The normal mode is different from the measurement mode and is a mode for communicating with the information terminal 40.

The AP unit 720 includes an Amplifier (AMP) unit 702, a Radio Frequency (RF) unit 703, a Base Band (BB) unit 704, a LAN unit 705, a Bluetooth (registered trademark) (BT) unit 706, and a CPU 701. The AMP unit 702 amplifies a signal output from the RF unit 703 and communicates with the information terminal 40 via a wireless LAN. Further, the AMP unit 702 receives a signal of the wireless LAN from the information terminal 40, changes a reception level, and outputs the changed signal to the RF unit 703.

The RF unit 703 performs analog-digital conversion on a signal to be transmitted to the information terminal 40 and a signal received from the information terminal 40. The BB unit 704 performs digital signal processing on a signal to be transmitted to the information terminal 40 and a signal received from the information terminal 40.

The LAN unit 705 is connected to the conference network 92 and the shared network 91 in a wired manner and performs data transmission and reception. The CPU 701 controls the AMP unit 702, the RF unit 703, the BB unit 704, the LAN unit 705, and the BT unit 706. The CPU 701 reads or writes data from or into the memory 707, the data being necessary for controlling communication of data with the information terminal 40.

The BT unit 706 communicates with the information terminal 40 (smart device 40a) via Bluetooth and transmits connection information to the information terminal 40 as will be described below. In addition, the BT unit 706 may be disposed outside the network connection controlling device 10. The BT unit 706 may perform communication in either standard, namely, Bluetooth LE or normal Bluetooth. Further, the BT unit 706 may perform communication via NFC, infrared, or the like.

The AP unit 720 includes two sets of hardware (the AMP unit 702, the RF unit 703, and the BB unit 704) to communicate with the information terminal 40 via a wireless LAN. Each set is for one channel of communication. When switching from the measurement mode to the normal mode, the network connection controlling device 10 selects a channel having a better radio wave state. Upon switching, the network connection controlling device 10 performs the channel switching by setting a new channel to be selected for hardware that is not currently used in order to prevent momentary stop of communication resulting from the channel switching.

For example, it is assumed that the AP unit 720 uses the AMP unit 702, the RF unit 703, and the BB unit 704 to communicate with the information terminal 40 via the wireless LAN and when the mode is switched to the measurement mode, a channel capable of communication is changed. Before returning to the normal mode, the AP unit 720 changes setting to perform communication in a new channel for the AMP unit 702, the RF unit 703, and the BB unit 704 that are not currently used, and then returns to the normal mode.

The tester unit 730 includes an AMP unit 712, an RF unit 713, a BB unit 714, a magnetic measuring unit 715, an electronic compass unit 716, and a CPU 711. The AMP unit 712, the RF unit 713, and the BB unit 714 are disposed as many as the number of areas of the wireless LAN. For example, if there are 18 areas, each of the numbers of the AMP units 712, the RF units 713, and the BB units 714 is 18. Communication in a single area is measured by the AMP unit 712, the RF unit 713, and the BB unit 714.

The AMP unit 712, the RF unit 713, and the BB unit 714 of the tester unit 730 have the same functions as in the AMP unit 702, the RF unit 703, and the BB unit 704 of the AP unit 720, so that a detailed description thereof is omitted.

The magnetic measuring unit 715 measures magnetism. The electronic compass unit 716 detects a direction of geomagnetism if the magnetism measured by the magnetic measuring unit 715 is approximately the same value as the geomagnetism (about 300 nG in proximity to the equator, about 600 nG in proximity to the north pole and the south pole, and about 500 nG in Japan). For example, if the magnetism measured by the magnetic measuring unit 715 is different from the value of the geomagnetism due to an influence of an electronics device located nearby, the electronic compass unit 716 manually receives the direction of a location. The electronic compass unit 716 detects in which direction the network connection controlling device 10 is located relative to the detected geomagnetism or the received direction.

The CPU 711 controls the AMP unit 712, the RF unit 713, the BB unit 714, the magnetic measuring unit 715, and the electronic compass unit 716. The CPU 711 reads or writes data from or into the memory 707, the data being necessary for measuring a location of the information terminal 40, a distance thereto, and the like. The CPU 711 determines whether an operation is performed in the normal mode or the measurement mode via the memory 707 and performs relevant processes.

The memory 707 stores data necessary for processing performed by the CPU 711. Further, the memory 707 has a MAC table in which information about the information terminal 40 is stored.

<As to Functions>

Figure 6:
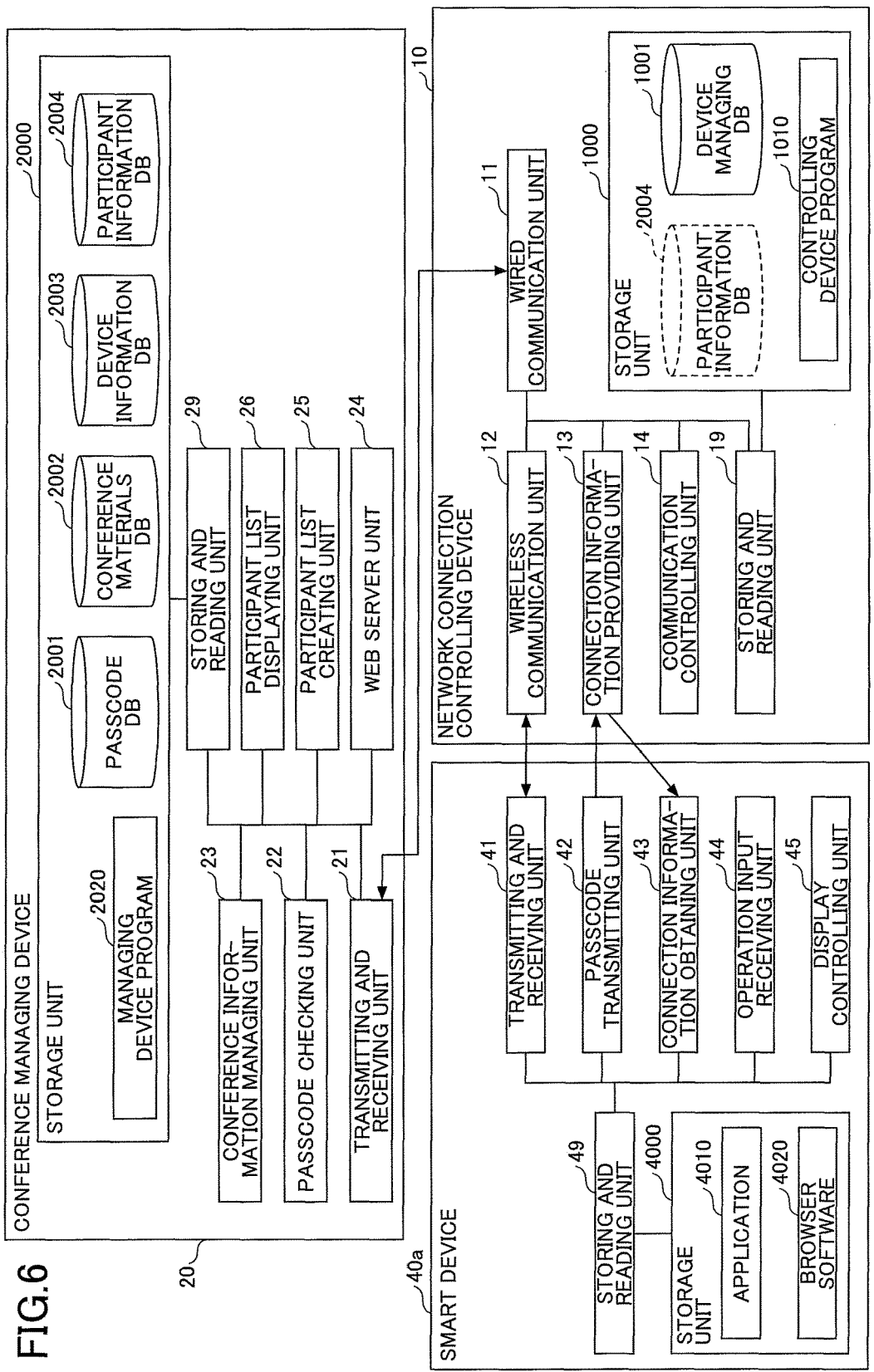
FIG. 6 is a functional block diagram of a conference managing device, a network connection controlling device, and an information terminal included in a communication system according to an embodiment of the present invention.

FIG. 6 is a functional block diagram of the conference managing device 20, the network connection controlling device 10, and the information terminal 40 included in the communication system 100 according to the embodiment of the present invention.

<<Functional Configuration of Smart Device 40a>>

The smart device 40a includes a transmitting and receiving unit 41, a passcode transmitting unit 42, a connection information obtaining unit 43, an operation input receiving unit 44, a display controlling unit 45, and a storing and reading unit 49. These units are functions or units which are implemented or provided when any one of the constituent elements illustrated in FIG. 4 operates in response to an instruction from the CPU 601 in accordance with an application 4010 (or browser software 4020) loaded in the RAM 603 from the EEPROM 604.

Further, the information terminal 40 also includes a storage unit 4000 constructed with the RAM 603, the ROM 602, and the EEPROM 604 illustrated in FIG. 4. The storage unit 4000 stores the application 4010 and the browser software 4020.

The transmitting and receiving unit 41 is implemented by an instruction from the CPU 601, the communication unit 612, the wireless LAN communication unit 613, and the like illustrated in FIG. 4. The transmitting and receiving unit 41 transmits and receives various types of data to and from the conference managing device 20 via the network connection controlling device 10.

The passcode transmitting unit 42 is implemented by an instruction from the CPU 601, the short-distance wireless communication unit 615, and the like illustrated in FIG. 4. The passcode transmitting unit 42 transmits a name, a passcode, and the like to the network connection controlling device 10.

The connection information obtaining unit 43 is implemented by an instruction from the CPU 601, the short-distance wireless communication unit 615, and the like illustrated in FIG. 4. The connection information obtaining unit 43 obtains, from the network connection controlling device 10, connection information to connect with the network connection controlling device 10 and the conference managing device 20.

TABLE 1

| Connection information | AP information | SSID | ABCDEFG |
|---|---|---|---|
| | | Encryption method | WEP |
| | | Password | XXXXXXXX |
| | Managing device network information | IP address | 192.168.1.1 |
| | | HTTP port number | 53080 |
| | | HTTPS port number | 530443 |

Table 1 schematically indicates connection information obtained by the connection information obtaining unit 43 from the network connection controlling device 10. The connection information has the "AP information" and the "managing device network information." The AP information is used for the smart device 40a to connect with an access point of the network connection controlling device 10. In other words, the AP information includes an SSID, a password, and the like required when accessing the access point. Further, a cryptographic algorithm supported by the access point is described.

The managing device network information includes an IP address of the conference managing device 20 and port numbers to be used, for example. The smart device 40a can connect with the network connection controlling device 10 and further connect with the conference managing device 20 by using the connection information.

Referring back to FIG. 6 for description, the operation input receiving unit 44 is implemented by an instruction from the CPU 601, the voice sound inputting unit 609, the touch panel 617, and the like illustrated in FIG. 4. The operation input receiving unit 44 receives various types of inputs from the user.

The display controlling unit 45 is implemented by an instruction from the CPU 601, the display screen 616, and the like illustrated in FIG. 4. The display controlling unit 45 causes the display screen 616 to display various types of UI screens in which screen information obtained from the conference managing device 20 is arranged on screen parts stored in advance. In addition, when the browser software 4020 operates in the smart device 40a, the display controlling unit 45 interprets the screen information described in HTML, JavaScript (registered trademark), or the like and causes display of the UI screen.

The storing and reading unit 49 is implemented by an instruction from the CPU 601, the RAM 603, the EEPROM 604, and the like illustrated in FIG. 4. The storing and reading unit 49 stores various types of data in the storage unit 4000 and reads out various types of data stored in the storage unit 4000.

<<Functional Configuration of Network Connection Controlling Device 10>>

The network connection controlling device 10 includes a wired communication unit 11, a wireless communication unit 12, a connection information providing unit 13, a communication controlling unit 14, and a storing and reading unit 19. These units are functions or units which are implemented or provided when any one of the constituent elements illustrated in FIG. 5 operates in response to an instruction from the CPU 701 or the CPU 711 in accordance with a controlling device program 1010 stored in the memory 707.

The network connection controlling device 10 also includes a storage unit 1000 constructed with the memory 707 illustrated in FIG. 5. The storage unit 1000 includes a device managing database (DB) 1001 and stores the controlling device program 1010. Further, the storage unit 1000 also includes a database storing the same information as in a participant information DB 2004 of the conference managing device 20. This database is used by the network connection controlling device 10 to refer to a participant information table. Accordingly, the participant information DB 2004 of the conference managing device 20 is copied in the network connection controlling device 10. However, the network connection controlling device 10 may not include the participant information DB 2004 but may send an inquiry about participant information to the conference managing device 20 in each access control. The participant information DB 2004 is described later, so that the device managing DB 1001 is described in the following.

TABLE 2

| Name | IP address | MAC address | Default gateway |
|---|---|---|---|
| Print server | 192.168.10.1 | 102030405060 | 192.168.10.1/24 |
| MFP | 192.168.10.2 | 102030405061 | 192.168.10.1/24 |
| Whiteboard | 192.168.20.1 | 102030405062 | 192.168.20.1/24 |
| Projector | 192.168.20.2 | 102030405063 | 192.168.20.1/24 |

Table 2 indicates an example of a device managing table constituting the device managing DB 1001. In the device managing table, names of devices connected to the conference network 92 and the shared network 91, IP addresses, MAC addresses, and default gateways are registered in advance. Whether the device is connected to the conference network 92 or the shared network 91 is determined by the default gateway. Further, the device includes the MAC address in an Ethernet frame and includes the IP address in an IP packet upon transmitting data, so that the network connection controlling device 10 can perform access control at least on the MAC level.

Further, because information about the information terminal 40 is not registered in the device managing table, it is readily possible to detect that an information terminal 40 not registered in the device managing table communicates with the network connection controlling device 10.

(Functions of Network Connection Controlling Device 10)

The wireless communication unit 12 is implemented by an instruction from the CPU 701 or the CPU 711, the AMP unit 702, the RF unit 703, the BB unit 704, and the like illustrated in FIG. 5. The wireless communication unit 12 transmits and receives various types of data to and from the information terminal 40.

The wired communication unit 11 is implemented by an instruction from the CPU 701 or the CPU 711, the LAN unit 705, and the like illustrated in FIG. 5. The wired communication unit 11 transmits and receives various types of data to and from each device (such as the print server 93 or the MFP 94) of the shared network 91 and each device (such as the conference managing device 20) of the conference network 92. A distinction between the wireless communication unit 12 and the wired communication unit 11 is for convenience sake of description. The wireless communication unit 12 may communicate with each device on the conference network 92.

The connection information providing unit 13 is implemented by an instruction from the CPU 701 or the CPU 711, the BT unit 706, and the like illustrated in FIG. 5. The connection information providing unit 13 transmits connection information to the information terminal 40. If the connection information providing unit 13 performs transmission in Bluetooth LE, the network connection controlling device 10 corresponds to a peripheral and the information terminal 40 corresponds to a central. The connection information providing unit 13 periodically transmits an advertisement packet and the information terminal 40 receives the advertisement packet if the information terminal 40 approaches the network connection controlling device 10 within a predetermined distance. In accordance with this, the information terminal 40 detects presence of the connection information providing unit 13 in proximity to its own terminal and the information terminal 40 connects with the network connection controlling device 10. When the information terminal 40 connects with the network connection controlling device 10, the information terminal 40 obtains connection information described in characteristics, for example. In addition, the above predetermined distance is adjusted depending on radio field strength (RSSI). In this embodiment, the predetermined distance is about one meter or less. In accordance with this, only if the information terminal 40 is present in proximity to the network connection controlling device 10, the information terminal 40 can obtain the connection information.

Further, if the connection information providing unit 13 performs transmission in NFC, the information terminal 40 operates as an RF tag reader and reads connection information stored in an NFC tag.

The communication controlling unit 14 is implemented by an instruction from the CPU 701 or the CPU 711 and the like illustrated in FIG. 5. The communication controlling unit 14 limits communication from the shared network 91 for conference network 92 and limits communication from the conference network 92 for shared network 91. Further, the communication controlling unit 14 limits connection by the information terminal 40 with the conference network 92 and limits or permits communication from the information terminal 40 to the shared network 91.

The storing and reading unit 19 is implemented by an instruction from the CPU 701 or the CPU 711, the memory 707, and the like illustrated in FIG. 5. The storing and reading unit 19 stores various types of data in the storage unit 1000 and reads out various types of data stored in the storage unit 1000.

As for a functional block diagram of the laptop computer 40b, the laptop computer 40b does not include the passcode transmitting unit 42 or the connection information obtaining unit 43. This is because an attendee manually inputs a passcode and connection information.

<<Functional Configuration of Conference Managing Device 20>>

The conference managing device 20 includes a transmitting and receiving unit 21, a passcode checking unit 22, a conference information managing unit 23, a Web server unit 24, a participant list creating unit 25, a participant list displaying unit are functions or units which are implemented or provided when any one of the constituent elements illustrated in FIG. 3 operates in response to an instruction from the CPU 506 in accordance with a managing device program 2020 loaded in the RAM 504 from the HDD 508.

Further, the conference managing device 20 also includes a storage unit 2000 constructed with the RAM 504, the ROM 505, and the HDD 508 illustrated in FIG. 3. The storage unit 2000 includes a passcode DB 2001, a conference materials DB 2002, a device information DB 2003, and the participant information DB 2004, and stores the managing device program 2020.

TABLE 3

| Conference ID | Passcode |
|---|---|
| 001 | 0090 |
| 002 | 2335 |

Table 3 indicates an example of a passcode table constituting the passcode DB 2001. In the passcode table, a conference ID and a passcode are registered in an associated manner. The registration of the conference ID and the passcode in the passcode table means that the passcode has been issued for the conference. In addition, an attendee does not need to be aware of the conference ID.

TABLE 4

| Conference ID | File name | Owner | Path |
|---|---|---|---|
| 001 | 123.ppt | Taro | ¥ . . . ¥kaigi1¥ |
|  | 234.doc | Jiro | ¥ . . . ¥kaigi1¥ |
|  | 345.xls | Saburo | ¥ . . . ¥kaigi1¥ |

Table 4 indicates an example of a conference materials table constituting the conference materials DB 2002. In the conference materials DB 2002, conference materials that can be referenced by an attendee are registered. In the conference materials table, a conference ID, a file name, an owner, and a path are registered. The file name represents a file name of conference material and the path represents a storage place of a file. The owner represents the name of an attendee that transmitted the file to the conference materials DB 2002. In addition, the conference materials in the conference materials DB 2002 are deleted when a conference ends.

TABLE 5

| Device type | IP address | Functions | |
|---|---|---|---|
| MFP | 192.168.10.1 | Printing | Scanning |
|  |  | Color | 300 |
|  |  | Duplex printing | 400 |
|  |  | Stapling | 600 |
|  |  | Punching | Photo/ |
|  |  | A3/A4/A5/B4 | characters/ |
|  |  |  | figure |
| Electronic whiteboard | 192.168.20.1 | . . . | |
| Projector | 192.168.20.2 | . . . | |

Table 5 indicates an example of a device information table constituting the device information DB 2003. In the device information DB 2003, devices connected to the conference network 92 or the shared network 91 are registered. In the device information table, a device type and an IP address are registered. As for the device type such as the MFP 94 for which the user can select a function, functions of the device are registered. For example, the MFP 94 supports printing functions including color, duplex printing, stapling, punching, and paper sizes of A3/A4/A5/B4. Further, the MFP 94 also supports scanning functions including resolutions of 300, 400, and 600 dpi and reading modes of a photo, characters, and a figure.

These functions are transmitted to the information terminal 40 and displayed on a screen rendered on the display screen 616 of the information terminal 40.

The conference information managing unit 23 is implemented by an instruction from the CPU 506 and the like illustrated in FIG. 3. The conference information managing unit 23 issues a passcode. Further, if an attendee transmits conference materials, the conference information managing unit 23 registers the conference materials in the conference materials DB 2002. Further, the conference information managing unit 23 manages holding, ending, suspending, and the like of a conference.

TABLE 6

| Attendee ID | Conference ID: 001 Name | Conference name: project A Passcode | Conference location: room A IP address | MAC address | Model number | Phone number | Mail address |
|---|---|---|---|---|---|---|---|
| 001 | Taro* | 0090 | 198.168.11.10 | ABCDEFGH | IOS, app | 03-1234-xxxx | ABC@DEF1.co.jp |
| 002 | Jiro | 0090 | 198.168.11.11 | ABCDEFGI | WINOS, browser | 03-1234-xxxx | ABC@DEF2.co.jp |
| 003 | Saburo | 0090 | 198.168.11.12 | ABCDEFGJ | IOS, browser | 03-1234-xxxx | ABC@DEF3.co.jp |

Table 6 indicates an example of a participant information table constituting the participant information DB 2004. One or more records in the participant information table are referred to as participant information. In the participant information table, participant information about a host and participants that participate in the conference are registered. In addition, even information about the host marked with "*" is also referred to as participant information.

The participant information table is identified by a conference ID. In the participant information table, a conference name and a conference location input by the host are registered. Further, one set of participant information has items of an attendee ID, a name, a passcode, an IP address, a MAC address, a model number, a phone number, and a mail address.

The attendee ID represents unique identification information for identifying an attendee. The attendee ID is assigned by the conference managing device 20. The name represents the name of an attendee, a user name, a nickname, or the like. The passcode represents symbols, numerical values, characters, or a combination thereof kept secret to participate in a conference. The passcode is common among attendees for a single conference. The IP address represents an IP address of the information terminal 40 (the IP address may be fixed or assigned by a DHCP server). The MAC address represents an address unique to the information terminal 40 in communication via a wireless LAN. The model number represents information for determining a client program operating on the information terminal 40. For example, an OS name, an application or a browser name, and a version thereof are registered. The model number is mainly referenced by the conference managing device 20 to transmit appropriate screen information. The phone number represents a phone number of the attendee. The mail address represents a mail address of the attendee. In addition, it is not necessary for the conference managing device 20 to obtain all of these items.

(Functions of Conference Managing Device 20)

The transmitting and receiving unit 21 is implemented by an instruction from the CPU 506, the communication I/F 507, and the like illustrated in FIG. 3. The transmitting and receiving unit 21 transmits and receives various types of data to and from the network connection controlling device 10, the projector 95, the electronic whiteboard 96, and the like. The transmitting and receiving unit 21 also communicates with the information terminal 40, the print server 93, and the MFP 94 via the network connection controlling device 10.

The passcode checking unit 22 determines whether a passcode transmitted by a participant to try to participate in a conference matches a passcode registered in the passcode table. If the passcodes match, the passcode checking unit 22 permits participation in the conference.

The Web server unit 24 is implemented by an instruction from the CPU 506 and the like illustrated in FIG. 3. The Web server unit 24 transmits screen information to be displayed on a screen to the information terminal 40. Examples of the screen information include a list of conference materials, the device information table, and the like. In addition, if the information terminal 40 operates the application 4010, the Web server unit 24 processes information for the application to create the screen information and if the information terminal 40 operates the browser software 4020, the Web server unit 24 processes information for the browser to create the screen information.

The participant list creating unit 25 is implemented by an instruction from the CPU 506 and the like illustrated in FIG. 3. The participant list creating unit 25 registers, in the participant information DB 2004, participant information about a participant permitted to participate in a conference.

The participant list displaying unit 26 is implemented by an instruction from the CPU 506 and the like illustrated in FIG. 3. The participant list displaying unit 26 creates screen information about a participant list from the participant information table and transmits the screen information to the information terminal 40 of an attendee.

The storing and reading unit 29 is implemented by the CPU 506, the HDD 508, the RAM 504, the ROM 505, and the like illustrated in FIG. 3. The storing and reading unit 29 stores various types of data in the storage unit 2000 and reads out various types of data stored in the storage unit 2000.

<Operation Procedure>

Figure 11:
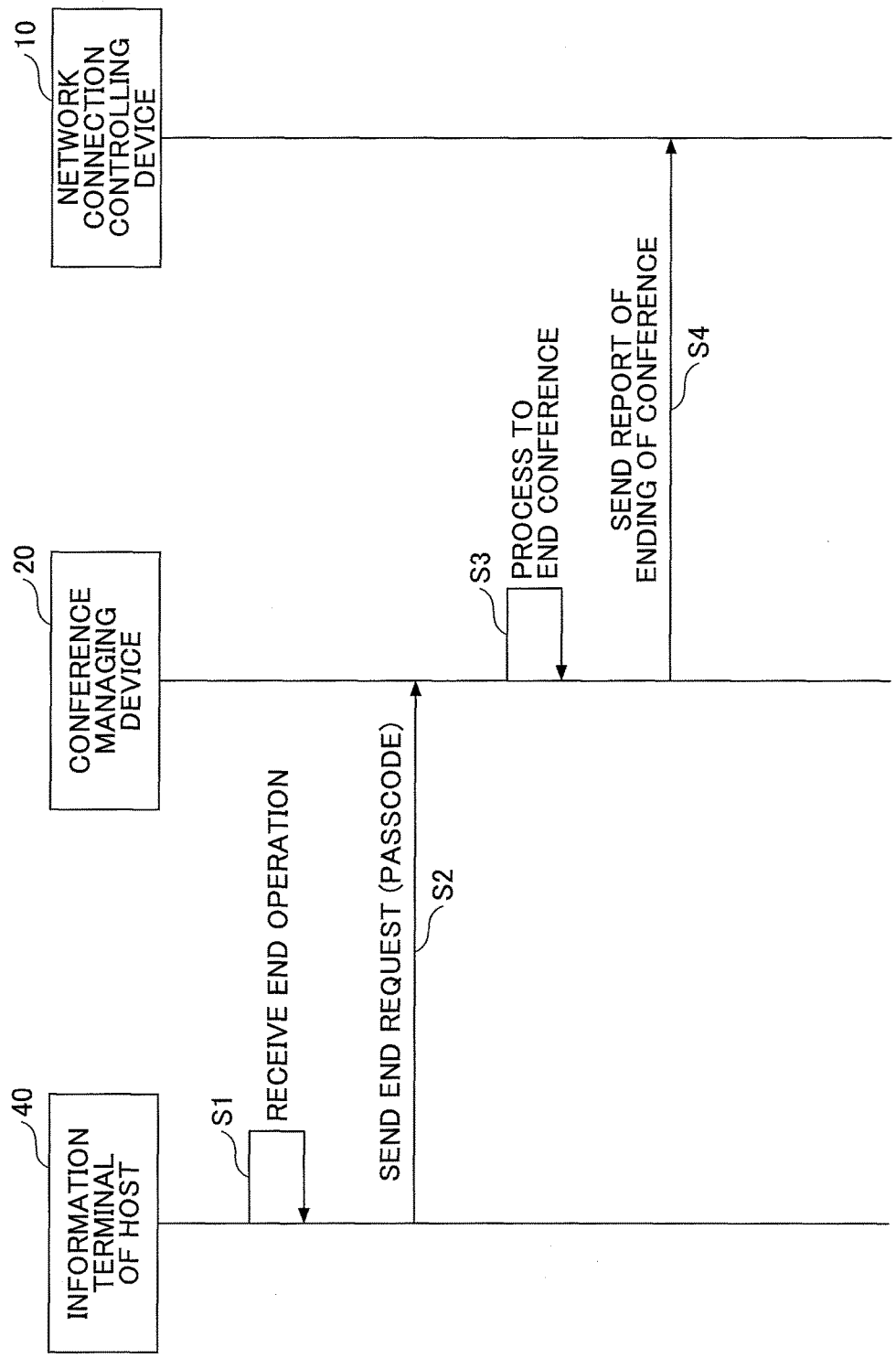
FIG. 11 is a sequence diagram depicting a procedure by which a host ends a conference according to an embodiment of the present invention.
Figure 12:
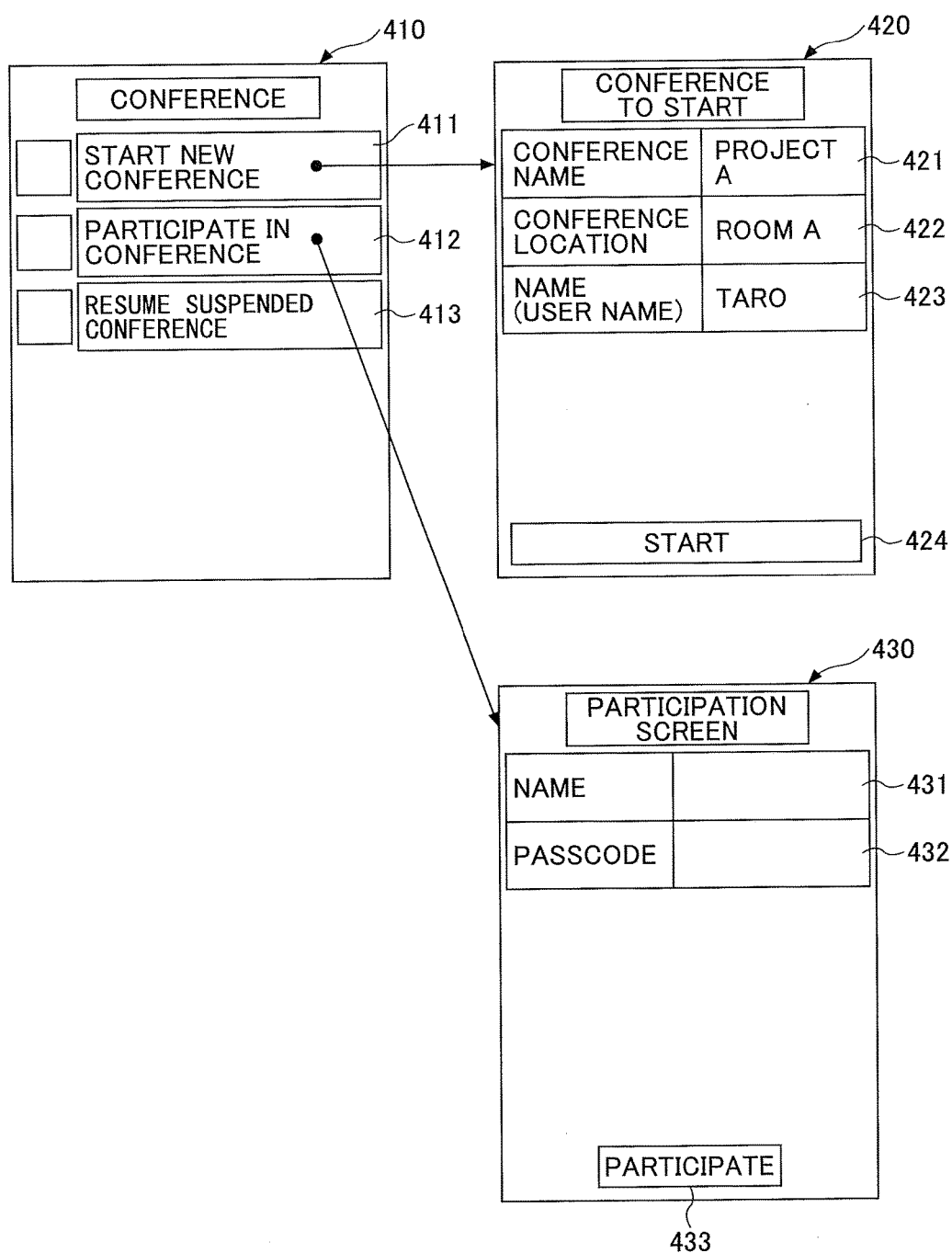
FIG. 12 is a diagram depicting screens displayed in an information terminal according to an embodiment of the present invention.
Figure 13:
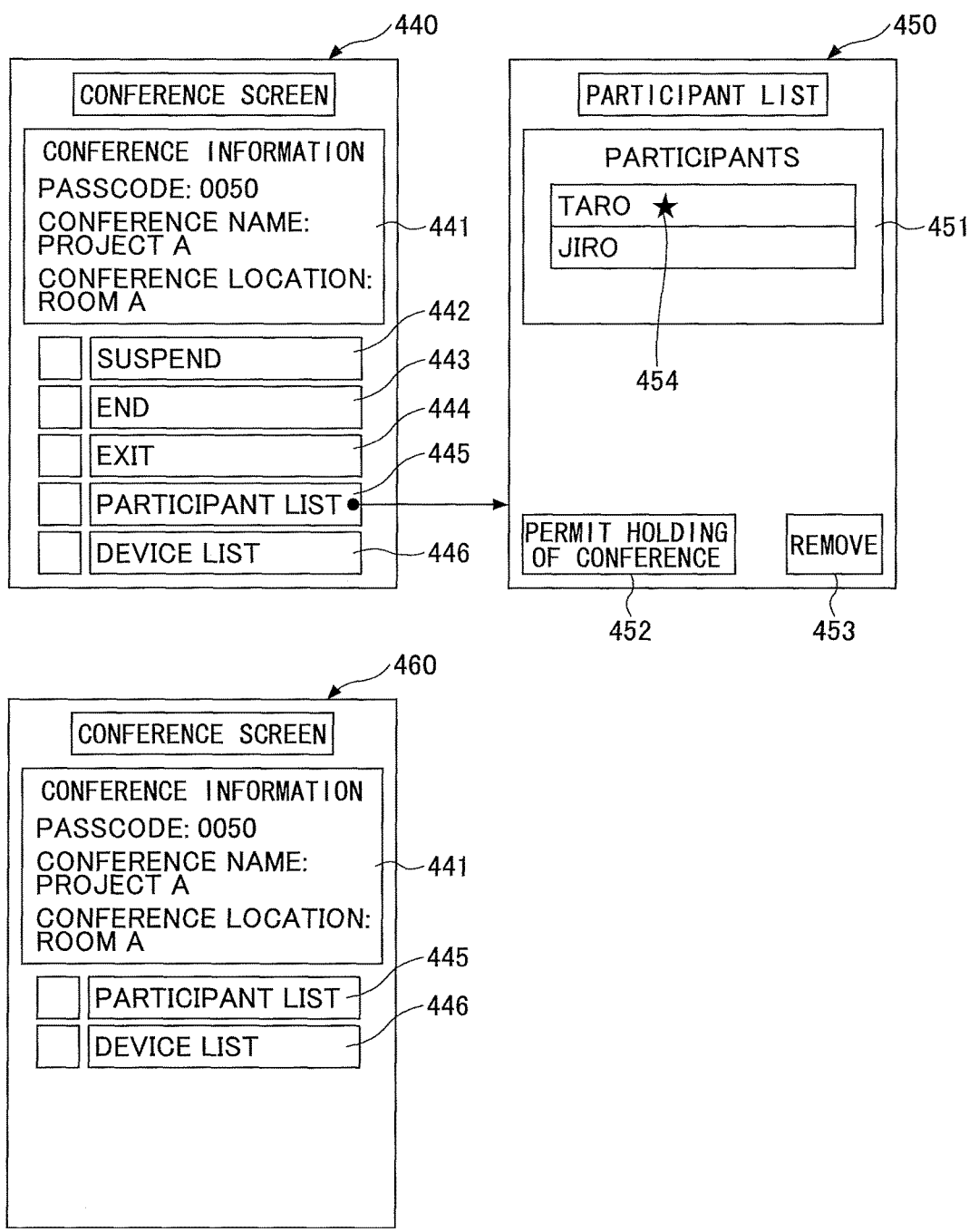
FIG. 13 is a diagram depicting screens displayed in an information terminal according to an embodiment of the present invention.

In the following, an operation when the communication system 100 holds a conference is described with reference to FIGS. 7 to 11. In this example, terms of starting of a conference and holding of a conference are used to mean different operations. Further, FIGS. 12 and 13 are diagrams depicting screens displayed on the display screen 616 of the smart device 40*a* and are referenced where necessary in the following description.

<<Starting of Conference>>

Figure 7:
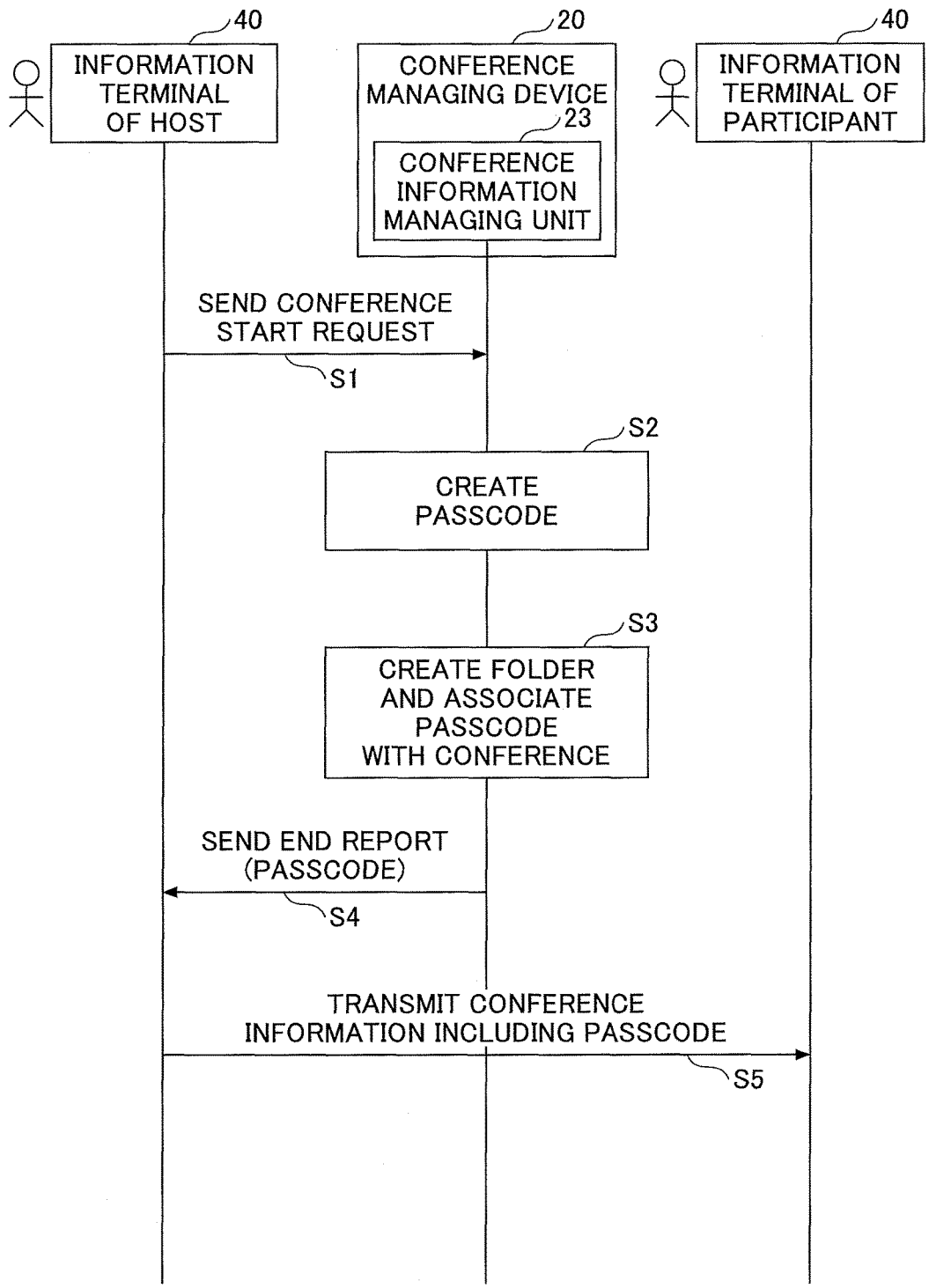
FIG. 7 is a sequence diagram depicting a procedure by which a host sends a request to start a conference (issue a passcode) to a conference managing device according to an embodiment of the present invention.

FIG. 7 is a sequence diagram depicting a procedure by which a host sends a request to start a conference (issue a passcode) to the conference managing device 20 according to the embodiment of the present invention. The host accesses the conference managing device 20 in the conference room 6 or in proximity to the conference room 6.

S1: The host operates the information terminal 40 to send a request for a conference start (request for a communication start) to the conference managing device 20. On an initial screen 410 of FIG. 12, the host presses a button 411 to newly start a conference and inputs conference information on a conference information inputting screen 420 of FIG. 12. When a start button 424 is pressed, the conference information is transmitted. The conference information may include information about conference date and time other than illustrated items.

S2: The transmitting and receiving unit 21 of the conference managing device 20 receives the request for a conference start and the conference information managing unit 23 assigns a conference ID and creates a passcode.

S3: The conference information managing unit 23 creates a folder, for example, where conference materials are stored, and registers the conference ID and the passcode in the passcode DB 2001. Further, the participant list creating unit 25 creates the participant information table in the participant information DB 2004 and registers records of the host in participant information table.

S4: Then the conference information managing unit 23 transmits a report of an end of the conference start to the information terminal 40 of the host. The report includes at least the passcode.

S5: When the report of an end of registration is received, the host transmits a report of holding of the conference including the passcode to participants via electronic mail, for example. If the participant is present nearby, the host may orally report the passcode. The report of holding of the conference may include a conference name, a conference location, conference date and time, and the like. In addition, the conference managing device 20 may directly transmit the report of holding of the conference to the participants.

<<Participation of Participant>>

Figure 8:
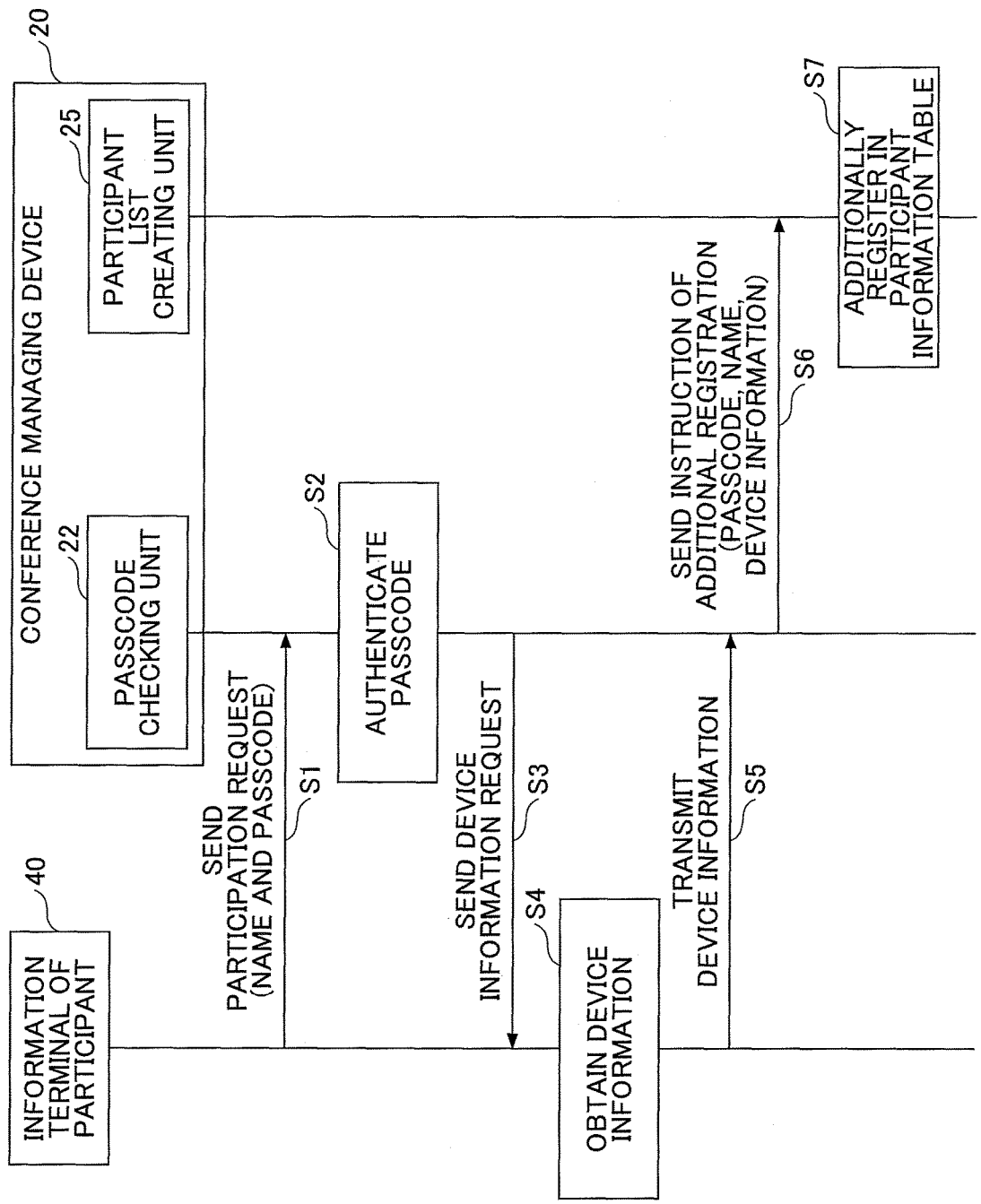
FIG. 8 is a sequence diagram depicting an operation performed by a conference managing device when a participant participates in a conference according to an embodiment of the present invention.

FIG. 8 is a sequence diagram depicting an operation performed by the conference managing device 20 when a participant participates in a conference according to the embodiment of the present invention. In FIG. 8, it is assumed that the information terminal 40 is a smart device 40a. A case where the information terminal 40 is a laptop computer 40b will be described later.

S1: The passcode transmitting unit 42 of the information terminal 40 sends a request to participate in the conference by transmitting its own name and the passcode transmitted by the host to the conference managing device 20 via the network connection controlling device 10. The participant sets the name and the passcode in the information terminal 40 in advance. The passcode transmitting unit 42 may directly transmit the name and the passcode to the conference managing device 20 without using the network connection controlling device 10. In the case of the smart device 40a, the smart device 40a transmits, via Bluetooth communication or the like, the name and the passcode to the network connection controlling device 10 upon approaching the network connection controlling device 10 within a predetermined distance. However, the name and the passcode may be transmitted from a screen such as a participation screen 430 depicted in FIG. 12. Further, along with the transmission of the name and the passcode, the connection information obtaining unit 43 of the smart device 40a obtains connection information S2: When the name and the passcode are received, the passcode checking unit 22 of the conference managing device 20 authenticates the passcode associated with a conference ID in the passcode DB 2001. Alternatively, the passcode may be authenticated using a passcode of the host in the participant information table. In both cases, whether a corresponding passcode is present is determined.

S3: If there is a corresponding passcode (authentication is successful), the passcode checking unit 22 sends a request for device information to the information terminal 40. The device information includes an IP address, a MAC address, a model number, a phone number of the user (information terminal 40), a mail address registered in the information terminal 40, and the like. In addition, the device information may be obtained after communication via a wireless LAN is established as illustrated in FIGS. 9A and 9B.

S4: The storing and reading unit 49 of the information terminal 40 obtains the device information from the storage unit 4000. One method for obtaining the device information assigned to its own device is to use an Application Programming Interface (API) that obtains the device information, for example. The storing and reading unit 49 uses the API to obtain the device information.

S5: The transmitting and receiving unit 41 of the information terminal 40 transmits the device information to the conference managing device 20.

S6: When the device information is received, the passcode checking unit 22 of the conference managing device 20 sends an instruction of additional registration to the participant list creating unit 25. The instruction of additional registration includes the passcode and the name received in step S1 in addition to the device information.

S7: The participant list creating unit 25 of the conference managing device 20 uses the passcode to identify the participant information table in which the host is registered and additionally registers the name of the participant permitted to participate, the passcode, and the device information in the participant information table of the conference. In this manner, participant information about each participant is registered in the participant information table.

After the holding of the conference described later, if the participant registered in the participant information DB 2004 sends, to the conference managing device 20, a request to access to a device or the conference materials DB 2002, the conference managing device 20 refers to the participant information DB 2004 and permits the access to the device or the conference materials DB 2002, for example.

<<Connection to Network Connection Controlling Device>>

FIG. 9A is a sequence diagram depicting a procedure by which the information terminal 40 is connected to the network connection controlling device 10 according to the embodiment of the present invention.

S1: In the case of the smart device 40a, the authentication using the passcode has been finished and the connection information has been obtained. Accordingly, the smart device 40a or the participant sets the connection information in its own device.

S2: The transmitting and receiving unit 41 of the smart device 40a connects with the wireless communication unit 12 of the network connection controlling device 10.

S3: The wireless communication unit 12 of the network connection controlling device 10 sends a request for connection to the wired communication unit 11.

S4: The wired communication unit 11 of the network connection controlling device 10 connects with the conference managing device 20 by using the IP address or the like (connection information) specified by the smart device 40a.

FIG. 9B is a sequence diagram depicting a procedure by which the laptop computer 40b is connected to the network connection controlling device 10 according to the embodiment of the present invention.

S1: In a case of a laptop computer without the short-distance wireless communication unit 615, the participant inputs the name and the passcode. The operation input receiving unit 44 of the laptop computer 40*b* receives the input of the name and the passcode.

S2: The participant also inputs the connection information. The operation input receiving unit 44 of the laptop computer 40*b* receives the input of the connection information. Paper in which the connection information is described may be handed out to participants that use the conference room 6 or such paper may be put up in the conference room 6. In addition, the connection information to be set in this case may only include AP information. When the laptop computer 40*b* accesses the network connection controlling device 10 by using the AP information, the network connection controlling device 10 redirects the laptop computer 40*b* to the conference managing device 20.

S3: The transmitting and receiving unit 41 of the laptop computer 40*b* transmits a participation request to the network connection controlling device 10 (communicates the participation request to the conference managing device 20 as a destination through the redirection).

S4: The wireless communication unit 12 of the network connection controlling device 10 sends the participation request to the wired communication unit 11.

S5: The wired communication unit 11 of the network connection controlling device 10 transmits the participation request to the conference managing device 20. Processing that follows this is the same as the processing from S2 in FIG. 8.

<<Permission to Hold Conference>>

The host confirms a state of participation and holds a conference. It is possible to hold the conference even if there is no participant.

Figure 10:
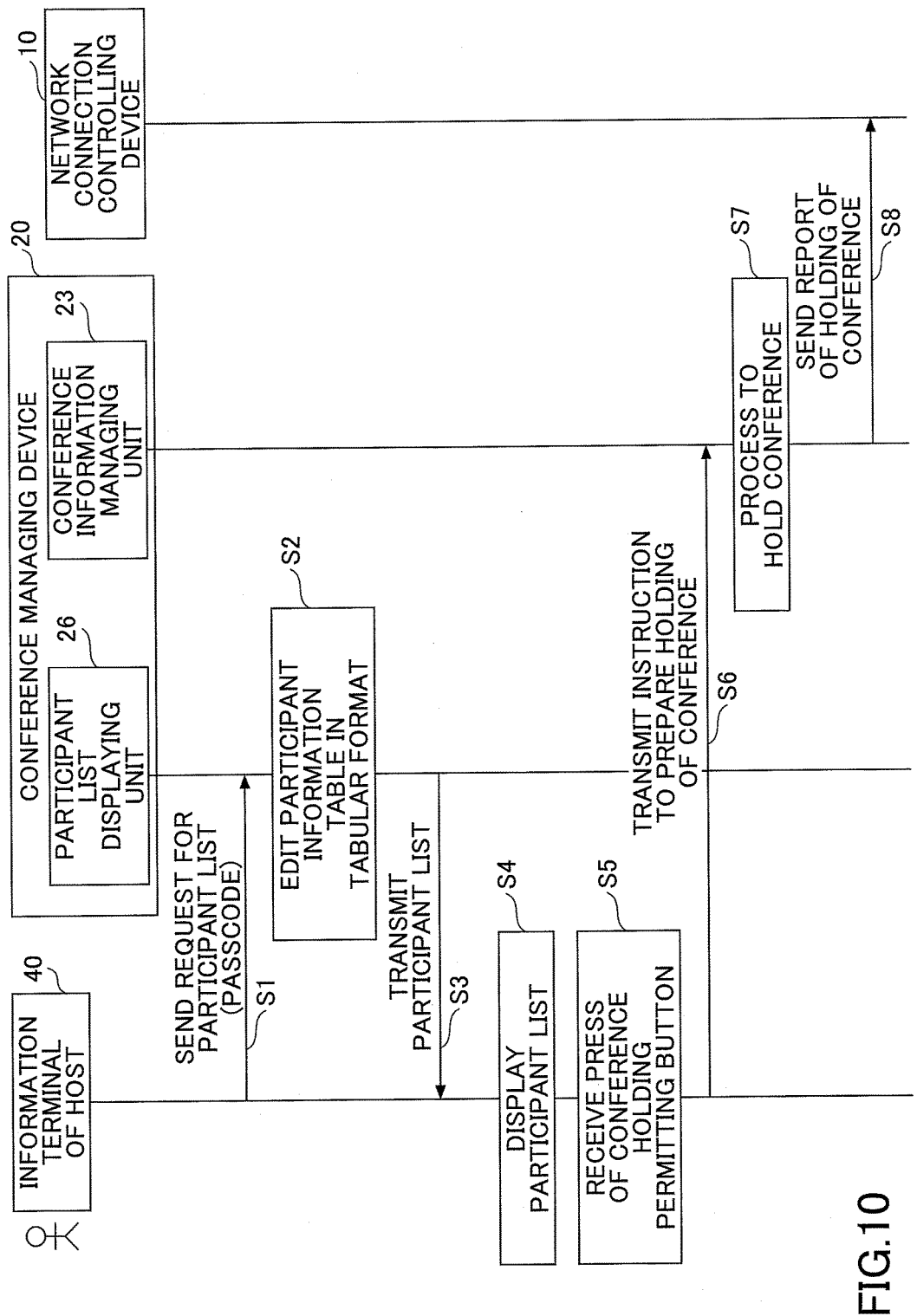
FIG. 10 is a sequence diagram depicting a procedure by which, after a participant participates in a conference, a participant list is displayed in information terminal of a host according to an embodiment of the present invention.

FIG. 10 is a sequence diagram depicting a procedure by which, after the participant participates in the conference, the host holds the conference according to the embodiment of the present invention.

S1: The host operates the information terminal 40 to send a request for a participant list to the conference managing device 20. Specifically, in a conference screen 440 of FIG. 13 displayed after the starting of the conference, a participant list button 445 is pressed. In addition, the conference screen 440 of FIG. 13 is transitioned from the conference information inputting screen 420 of FIG. 12. Further, the information terminal 40 of the host transmits the passcode or the conference ID to identify the conference.

S2: The participant list displaying unit 26 of the conference managing device 20 uses the passcode or the conference ID to identify the participant information table and edits the identified participant information table in a tabular format to create screen information. In addition, the participant list displaying unit 26 creates appropriate screen information based on the model number of the information terminal 40 of the host. In other words, the appropriate screen information is created depending on a combination of an OS and an application or a combination of the OS and a browser. For example, the participant list displaying unit 26 creates the screen information for which description that can be interpreted by the application or the browser is selected and the size of the installed display screen 616 is considered.

S3: The participant list displaying unit 26 of the conference managing device 20 transmits the created screen information about the participant list to the information terminal 40 of the host.

S4: The display controlling unit 45 of the information terminal 40 displays the participant list on the display screen 616. On the display screen 616 of the information terminal 40, a participant list screen 450 as illustrated in FIG. 13 is displayed. The host can confirm the participants on the participant list screen 450.

S5: The operation input receiving unit 44 of the information terminal 40 receives an operation of the host. In other words, if the host confirms that persons that should participate in the conference are listed, the host determines that it is possible to hold the conference and presses a conference holding permitting button 452 on the participant list screen 450 of FIG. 13. The operation input receiving unit 44 receives the press of the conference holding permitting button 452. The information terminal 40 may determine that there is at least one participant and hold the conference.

S6: When the conference holding permitting button 452 is pressed, the transmitting and receiving unit 41 of the information terminal 40 transmits an instruction to prepare holding of the conference to the conference information managing unit 23 of the conference managing device 20.

S7: When the conference information managing unit 23 of the conference managing device 20 receives the instruction to prepare holding of the conference, the conference information managing unit 23 performs a process necessary to hold the conference. Examples of the process necessary to hold the conference include permission of access to the folder of the conference materials to be used in the conference, permission of communication with a device, and the like.

S8: The conference managing device 20 transmits a report of holding of the conference to the network connection controlling device 10. The report of holding of the conference is for reporting that the conference is held. In accordance with this, the network connection controlling device 10 starts access control (moves to an access controlling state).

In addition, the holding of the conference may not require an operation of the host. For example, it is possible to hold the conference if the host or at least one participant participates.

<<End of Conference>>

The host ends the conference when a discussion ends or an end time comes. FIG. 11 is a sequence diagram depicting a procedure by which the host ends the conference according to the embodiment of the present invention.

S1: The host operates the information terminal 40 to press an end button 443 on the conference screen 440 of FIG. 13. The operation input receiving unit 44 of the information terminal 40 receives this operation.

S2: The information terminal 40 of the host transmits an end request to the conference managing device 20. The information terminal 40 transmits a passcode or a conference ID to identify the conference.

S3: When the end request is received, the conference information managing unit 23 of the conference managing device 20 performs a process to end the conference. Examples of the process to end the conference include prohibition of access to the folder of the conference materials to be used in the conference, prohibition of communication with a device, or the like. Further, the conference materials are deleted.

S4: The conference information managing unit 23 of the conference managing device 20 transmits a report of ending of the conference to the network connection controlling device 10. In accordance with this, the network connection controlling device 10 detects the end of the conference and ends the access control.

In addition, the ending of the conference may not require an operation of the host. For example, it is possible to end the conference if a time when the host and the network connection controlling device 10 are not in communication becomes a predetermined time or more.

<Screen Examples>

In FIG. 12, the initial screen 410 indicates a screen before the conference start. Specifically, in FIG. 12, the initial screen 410 is rendered on the display screen 616 of the smart device 40a. The laptop computer 40b can display the initial screen 410 in the same manner with a different layout.

The initial screen 410 of FIG. 12 has the button 411 to newly start a conference, a button 412 to participate in a conference, and a button 413 to resume a suspended conference. If the host starts a conference, the host presses the button 411 to newly start the conference. If a participant participates in the conference, the participant presses the button 412 to participate in the conference.

In FIG. 12, the conference information inputting screen 420 is displayed when the button 411 to newly start the conference is selected. The conference information inputting screen 420 has a conference name field 421, a conference location field 422, and a name field 423. The host inputs a conference name into the conference name field 421, a conference location (such as the name of a conference room) into the conference location field 422, and the name of the host into the name field 423 and then presses the start button 424.

In FIG. 12, the participation screen 430 is displayed when the button 412 to participate in the conference is selected. As described above, in the case of the smart device 40a, it is possible to transmit a name and a passcode upon obtaining connection information without such a screen. The participation screen 430 has a name field 431 and a passcode field 432. The participant inputs the name of the participant into the name field 431 and the passcode into the passcode field 432 and then presses a participation button 433.

FIG. 13 is a diagram depicting screens displayed after the conference start. In FIG. 13, the conference screen 440 is displayed on the smart device 40a of the host. The conference screen 440 of the host has a conference information field 441, a suspension button 442, the end button 443, an exit button 444, the participant list button 445, and a device list button 446. In the conference information field 441, in addition to the information input by the host on the conference information inputting screen 420, the passcode issued by the conference managing device 20 is displayed.

In FIG. 13, the participant list screen 450 is displayed on the smart device 40a of the host when the host presses the participant list button 445. The names of participants are displayed in a list on the participant list screen 450 of the smart device 40a of the host. In FIG. 13, the participant list screen 450 depicts a state where the host and one participant are listed. The host is displayed with a host mark 454.

The participant list screen 450 displayed on the information terminal 40 of the host has the conference holding permitting button 452 and a removal button 453. The conference holding permitting button 452 is for permitting holding of the conference. In accordance with this, an attendee can access conference materials and the like. The removal button 453 is a button for forcibly removing a participant.

In FIG. 13, a conference screen 460 is displayed on the smart device 40a of the participant. The conference screen 460 is displayed in accordance with authentication via the passcode or transitioned from the participation screen 430 of FIG. 12. The conference screen 460 displayed on the information terminal 40 of the participant has the participant list button 445 allowed for the participant to operate and the device list button 446.

<Access Control by the Network Connection Controlling Device>

FIG. 14 is a flowchart depicting a procedure by which the network connection controlling device 10 performs access control according to the embodiment of the present invention.

The communication controlling unit 14 of the network connection controlling device 10 determines whether a report of holding of a conference is received from the conference managing device 20 (S10).

If the report of holding of the conference is not received (No in S10), the communication controlling unit 14 does not perform access control (S40). Accordingly, communication is permitted from the shared network 91 to the conference network 92 and from the conference network 92 to the shared network 91. For example, with reference to FIG. 2, before the conference is held, the information terminal 40 that participates in the conference can communicate with the Internet 97 and the MFP 94.

If the report of holding of the conference is received (Yes in S10), the communication controlling unit 14 performs the access control (S20). Accordingly, the communication controlling unit 14 prohibits communication from the shared network 91 to the conference network 92 and from the conference network 92 to the shared network 91. By contrast, the communication controlling unit 14 permits communication from the information terminal 40 to the print server 93 and the MFP 94 registered in the device managing DB 1001. Specifically, the communication controlling unit 14 performs the access control as follows.

(i) Communication within the Conference Network 92

The access control is not performed.

(ii) Communication from the Conference Network 92 Side to the Shared Network 91

Communication from the conference network 92 side to the shared network 91 is basically prohibited. However, if a transmission source is registered in the participant information table and a destination is registered in the device managing table, transmission to the shared network 91 is permitted. This is because an attendee has logged in using the passcode, and so access to a device may be permitted. Accordingly, the information terminal 40 can communicate with the MFP 94 of the shared network 91. In addition, such determination can be made based on at least one of a name, an IP address, and a MAC address.

The host or the like can set whether to permit communication from a device connected to the conference network 92 to a device of the shared network 91 as follows. For example, if a device registered in the device managing table may be determined as reliable, in a case where both of a transmission source and a destination are registered in the device managing table, the host permits the device connected to the conference network 92 to communicate with the device of the shared network 91. By contrast, if there is a concern that a device connected to the conference network 92 may be operated by malware and conference materials may be leaked from the device, the host prohibits the device connected to the conference network 92 from communicating with the device of the shared network 91.

In addition, none of the information terminal 40 and devices registered in the device managing table cannot communicate with the Internet 97 as a destination.

Communication with the shared network 91 by the conference managing device 20 may be permitted. This is because the conference managing device 20 needs to manage connectivity of the device of the shared network 91 and control cooperation between the device of the conference network 92 and the device of the shared network 91. However, if the conference managing device 20 does not need to communicate with the device of the shared network 91, the communication with the shared network 91 by the conference managing device 20 may be prohibited.

(iii) Communication from the Shared Network 91 Side to the Conference Network 92

Only a reply to communication from the conference network 92 is permitted.

In accordance with such access control, it is possible to permit printing and the like necessary for a conference and prevent leakage of conference materials to the outside. In addition, while the conference is held, if the information terminal 40 sends a communication request to a device other than those devices registered in the device managing table, the communication controlling unit 14 redirects the information terminal 40 to a predetermined URL of the conference managing device 20. Alternatively, the communication controlling unit 14 causes display of an error message.

Next, the communication controlling unit 14 determines whether a report of ending of the conference is received from the conference managing device 20 (S30).

If the report of ending of the conference is not received (No in S30), the communication controlling unit 14 continuously performs the access control.

If the report of ending of the conference is received (Yes in S30), the communication controlling unit 14 does not perform the access control (S40). In other words, the communication controlling unit 14 cancels the access control.

<<Variations>>

In the procedure of FIG. 14, if a conference is not held, the network connection controlling device 10 cannot start the access control. Although there is not much inconvenience because access to the conference materials is possible after the conference is held, the access control may be started earlier.

Further, in the procedure of FIG. 14, it is impossible to start the access control if the conference is held immediately in response to participation of an attendee (logs in using a passcode). In this case, the access control is preferably started together with the participation in the conference.

FIG. 15 is a flowchart depicting a procedure by which the network connection controlling device 10 performs access control according to the embodiment of the present invention.

The communication controlling unit 14 of the network connection controlling device 10 determines whether a device (information terminal 40) not registered in the device managing table is connected (S12).

If the determination in step S12 is Yes, the communication controlling unit 14 performs the access control (S20). If the determination in step S12 is No, the communication controlling unit 14 does not perform the access control (S30). According to such a process, if there is a device (information terminal 40) that is not registered in the device managing table, it is possible to constantly limit communication with devices registered in the device managing table. Further, in a case of the communication system 100 in a form where a conference is held in response to participation in the conference (namely, if an attendee participates in the conference, the attendee can browse conference materials), it is possible to prevent leakage of the conference materials.

As described above, the communication system 100 in this embodiment can prevent leakage of information about the conference materials while permitting the use of a device used in the conference. Accordingly, there is no need to build a costly VLAN. Further, because the access control is linked with the holding and the ending of the conference, an attendee can understand timing of the access control as long as the attendee is aware of the holding and the ending of the conference.

Example 2

In Example 2, a case where the network connection controlling device 10 supports an encrypted network and an unencrypted network is described.

Figure 16A:
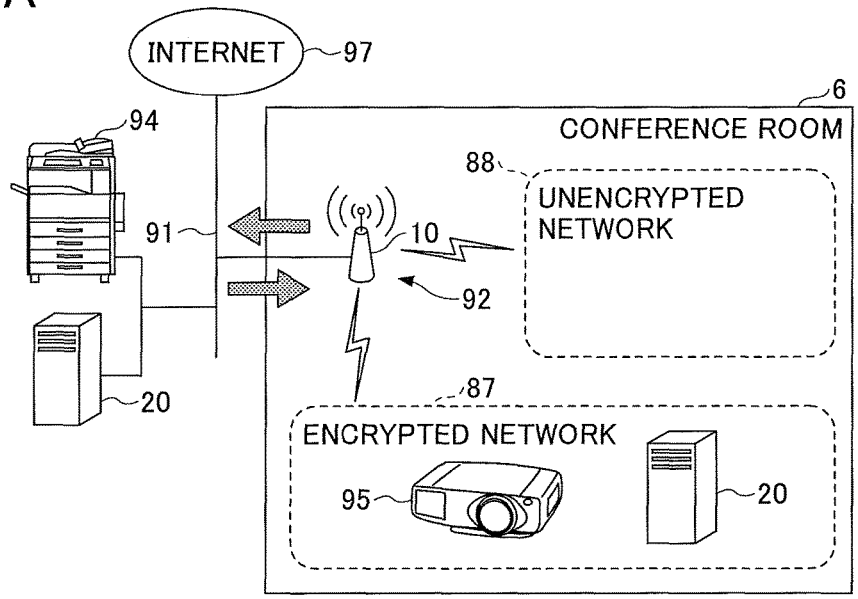
FIG. 16A is a schematic configuration diagram of a communication system according to an embodiment of the present invention (Example 2)
Figure 16B:
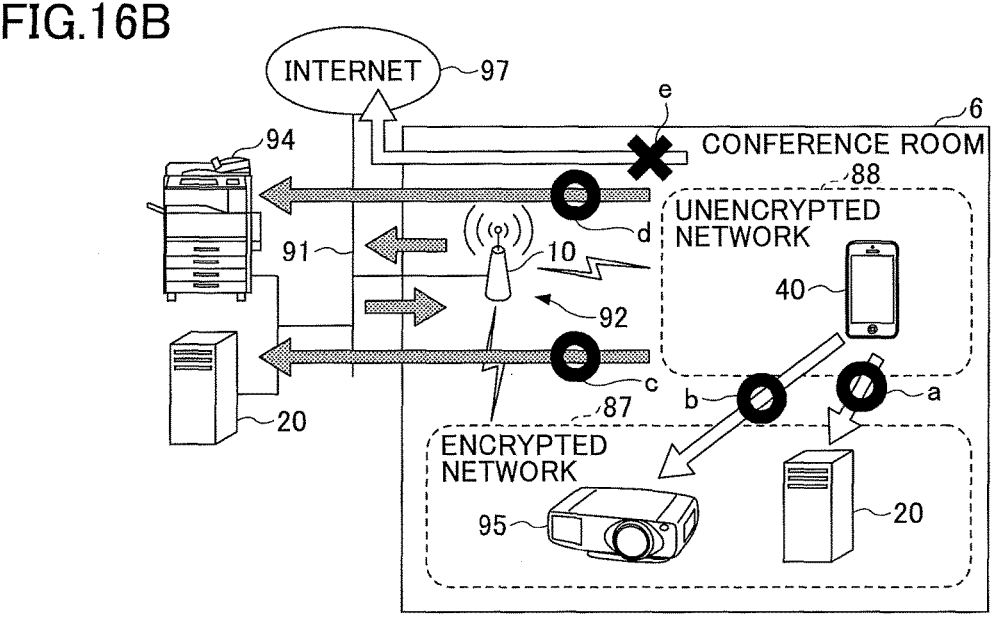
FIG. 16B is a schematic configuration diagram of a communication system according to an embodiment of the present invention (Example 2)

FIGS. 16A and 16B are schematic configuration diagrams of the communication system 100 according to the embodiment of the present invention. In FIGS. 16A and 16B, constituent elements to which the same reference numerals as in FIGS. 1A and 1B are assigned fulfil the same functions, so that only major constituent elements of Example 2 may be mainly described.

The network connection controlling device 10 of FIG. 16A has both an SSID of an encrypted network 87 and an SSID of an unencrypted network 88. First, a device such as the projector 95 is connected to the encrypted network 87. The information terminal 40 can connect with either the encrypted network 87 or the unencrypted network 88. Further, in FIGS. 16A and 16B, the conference managing device 20 is disposed in both of the shared network 91 and the conference network 92 for convenience sake of description. Further, the conference managing device 20 of the conference room 6 is connected to the encrypted network 87. Each of the two conference managing devices 20 can perform communication over HTTPs.

In the communication over HTTPs, information is encrypted and it is possible perform manipulation detection. A device or communication for which prevention of information leakage is considered as in HTTPs is hereafter referred to as a security-enabled device or communication (secure device). A communication protocol of the security-enabled device is not limited to HTTPs but may be a communication protocol such as SPDY, HTTP2.0, or the like kept secret through encryption.

The conference managing device 20 is disposed on the shared network 91 in order to have a conference with a remote location, for example. Further, the security-enabled device is not limited to the conference managing device 20. Examples of the security-enabled device include, but are not limited to, a file server, an authentication server, and the like.

It is assumed that the information terminal 40 is connected to the unencrypted network 88. In this case, the information terminal 40 participates in a conference and the conference is yet to be held. In the case of the connection with the unencrypted network 88, it is possible to connect with the network connection controlling device 10 without inputting a password, so that the participant can speedily participate in the conference.

FIG. 16B is a schematic configuration diagram illustrating the case where the information terminal 40 is connected to the unencrypted network 88. Even in the case of the connection with the unencrypted network 88, the information terminal 40 can communicate with a device of the encrypted network 87 such that the information terminal 40 can use the device (referenced at "b"). Further, the information terminal 40 can communicate with the conference managing device 20 of the conference network 92 (referenced at "a"). Further, the information terminal 40 can communicate with the MFP 94 registered in the device managing table (referenced at "d"). However, because the conference is yet to be held, the information terminal 40 cannot access conference materials or operate the device.

When the information terminal 40 is connected to the unencrypted network 88, the network connection controlling device 10 permits access to the security-enabled conference managing device 20. This is because information is encrypted, so that there is little possibility of leakage. Accordingly, the information terminal 40 can communicate with the conference managing device 20 of the shared network (referenced at "c"). In accordance with this, before the conference is held, the attendee can access a security-enabled resource of the shared network 91 (such as the conference managing device 20 or a file server). It is impossible to communicate with the Internet 97, so that information leakage is prevented. Further, even if the conference managing device 20 is present only on the shared network 91, it is possible to at least connect to the encrypted network 87 using the SSID and a password of connection information.

However, connection to the Internet 97 is prohibited (referenced at "e"). If there is a request to connect to the Internet 97, the network connection controlling device 10 redirects the information terminal 40 to a URL (such as a screen into which an SSID and a password are input) of an initial screen of the conference managing device 20 of the shared network 91. Accordingly, it is possible to prevent the information terminal 40 (such as a given device not located in the conference room 6) from freely connecting with the Internet 97, the information terminal 40 being connected to the unencrypted network 88. Further, from the redirected screen, the participant can connect with the encrypted network 87 by inputting the SSID and the password.

Figure 17:
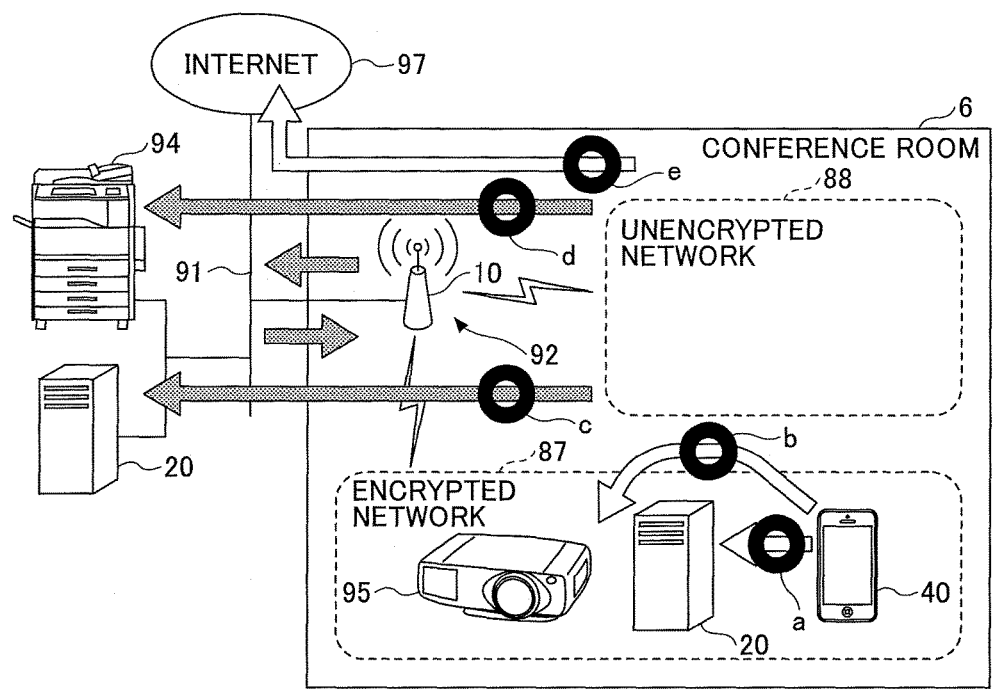
FIG. 17 is a diagram illustrating access control on a participating information terminal according to an embodiment of the present invention.

In the following, a case where the information terminal 40 is connected to the encrypted network 87 is described. In this case, the conference is yet to be held. FIG. 17 is a diagram illustrating the case where the information terminal 40 is connected to the encrypted network 87. If the information terminal 40 is connected to the encrypted network 87, the information terminal 40 can access the Internet 97 (referenced at "e"). This is because the information terminal 40 participates in the conference using the SSID and the password of the connection information, so that it is possible to determine that the information terminal 40 is authorized to use facilities of the conference room 6. Further, before the conference is held, communication with the Internet 97 may be permitted. In accordance with this, convenience for the participant is improved because it is possible to receive mail and gather information until the conference is held. Other access control (referenced at "a" to "d") is the same as in the connection to the unencrypted network 88.

Figure 18A:
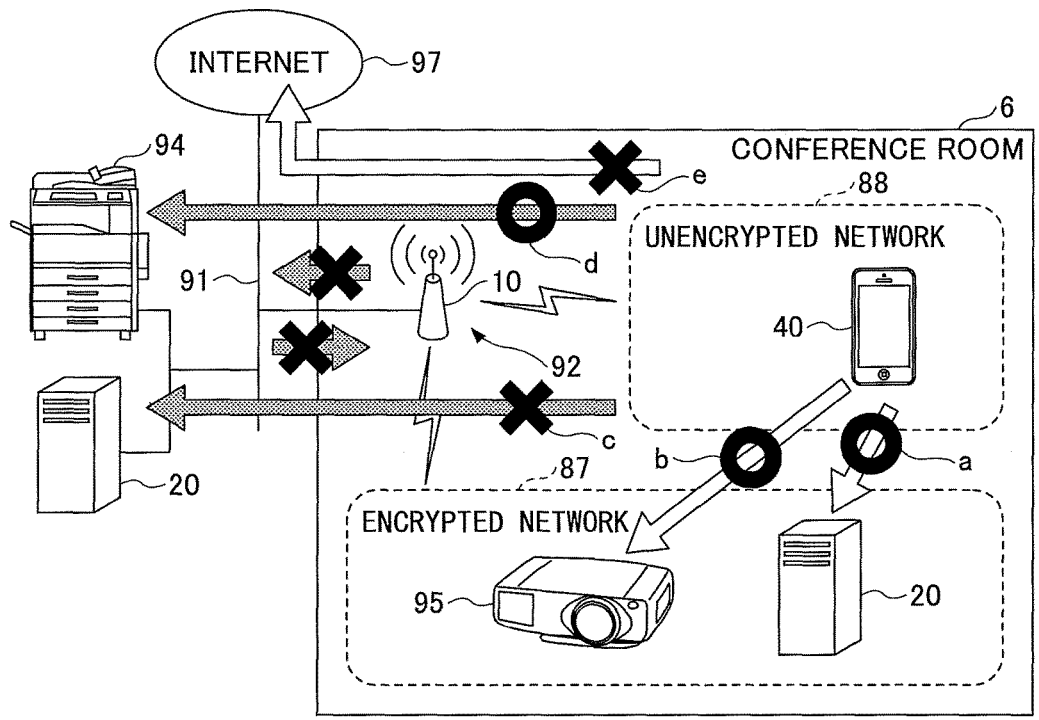
FIG. 18A is a diagram illustrating access control on an information terminal while a conference is held according to an embodiment of the present invention.

In the following, cases where the conference is held are described with reference to FIGS. 18A and 18B. FIG. 18A is a diagram illustrating the case where the information terminal 40 is connected to the unencrypted network 88. When the conference is held, the information terminal 40 can communicate with only a device registered in the device managing table. In other words, communication is more limited than in FIG. 16B (access control referenced at "c" is changed from permission to prohibition). If it is necessary to communicate with the conference managing device 20 of the shared network 91 in order to hold a conference with other location, the conference managing device 20 of the shared network 91 may be registered in the device managing table.

Figure 18B:
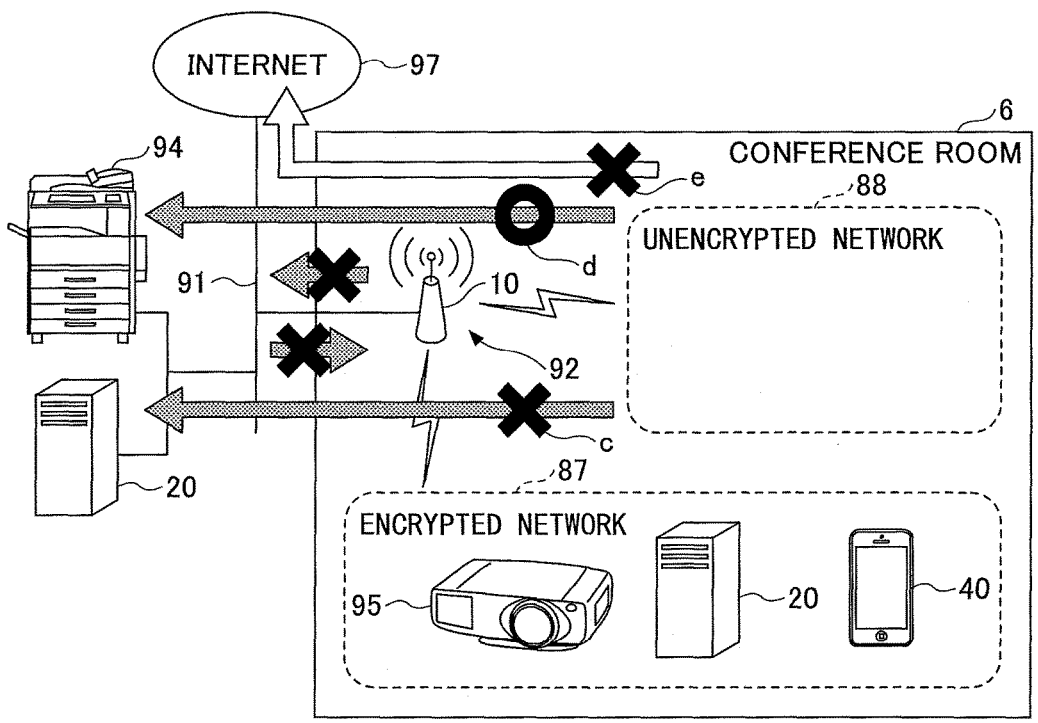
FIG. 18B is a diagram illustrating access control on an information terminal while a conference is held according to an embodiment of the present invention.

FIG. 18B is a diagram illustrating the case where the information terminal 40 is connected to the encrypted network 87. In this case, communication to a destination not registered in the device managing table is prohibited. Accordingly, when the conference is held, the information terminal 40 can communicate with only a device registered in the device managing table. In other words, communication to the Internet 97 is limited in comparison with FIG. 17 (access control referenced at "e" is changed from permission to prohibition). Further, in this case, a state of FIG. 18B is the same as in FIG. 18A.

As described above, if the information terminal 40 connects with the unencrypted network 88, the participant owning the information terminal 40 can easily participate in the conference. However, a level of available communication is limited accordingly. In other words, if the level of available communication may be limited, the participant owning the information terminal 40 may connect with the unencrypted network 88. Accordingly, it is possible to improve convenience for the participant. If the information terminal 40 connects with the encrypted network 87, the participant owning the information terminal 40 can connect with the Internet 97 before the conference is held.

FIG. 19 is a flowchart depicting a procedure by which the network connection controlling device 10 performs access control according to the embodiment of the present invention. In addition, it is assumed that the information terminal 40 participates in the conference.

The communication controlling unit 14 determines whether connection is from the encrypted network 87 or the unencrypted network 88 (S10). This is determined using an SSID specified by the information terminal 40.

If the connection is from the encrypted network 87 (Yes in S10), the communication controlling unit 14 does not perform the access control (S80). In other words, the information terminal 40 can communicate with a device outside the conference room 6 as illustrated in FIG. 17.

If the connection is from the unencrypted network 88 (No in S10), the communication controlling unit 14 determines whether a destination is registered in the device managing table (S20).

If a result of the determination in step S20 is Yes, the communication controlling unit 14 permits communication (S30).

If the result of the determination in step S20 is No, the communication controlling unit 14 determines whether the connection is to the Internet (S40). This is determined based on whether an IP address of the destination is included in network addresses (in common with default gateways) of the shared network 91 used in a company and the conference network 92, for example.

If a result of the determination in step S40 is Yes, the communication controlling unit 14 redirects the information terminal 40 to the conference managing device 20 (S50). If the information terminal 40 runs the application 4010, the communication controlling unit 14 transmits an error message, for example, because the redirection is difficult.

If the result of the determination in step S40 is No, the communication controlling unit 14 determines whether the destination supports security (S60). For example, if the destination supports security such as communication over HTTPs, a port number is 443, so that whether the port number of the destination is 443 is determined. Alternatively, if an IP address, a MAC address, or a port number of a security-enabled device is registered in the network connection controlling device 10, the determination can be made based on the registered item.

If a result of the determination in step S60 is Yes, the communication controlling unit 14 permits communication (S70). If the result of the determination in step S60 is No, the communication controlling unit 14 redirects the information terminal 40 to the conference managing device 20 or transmits an error message (S50).

In accordance with such control, it is possible to perform the access control as illustrated in FIGS. 16A, 16B, and 17. While the conference is held subsequently, the access control when the conference is held is the same as in Example 1 in both of the encrypted network 87 and the unencrypted network 88. In other words, the information terminal 40 can communicate with only a device registered in the device managing table. Accordingly, while the conference is held, if the information terminal 40 sends a communication request to a device other than those devices registered in the device managing table, the communication controlling unit 14 redirects the information terminal 40 to a predetermined URL of the conference managing device 20. Alternatively, the communication controlling unit 14 causes display of an error message.

As mentioned above, in the communication system 100 according to Example 2, the unencrypted network 88 is prepared, so that it is possible to readily participate in a conference. When the information terminal 40 is on the unencrypted network 88, the information terminal 40 is permitted to communication with a security-enabled device while participating in the conference. When the conference is held, the information terminal 40 can communicate with a device registered in the device managing table. Further, when the information terminal 40 is on the encrypted network 87, the information terminal 40 can access the Internet while participating in the conference, so that it is possible to receive mail and gather information.

Example 3

In Example 3, the communication system 100 in which a device can update software while a conference is held is described.

Figure 20:
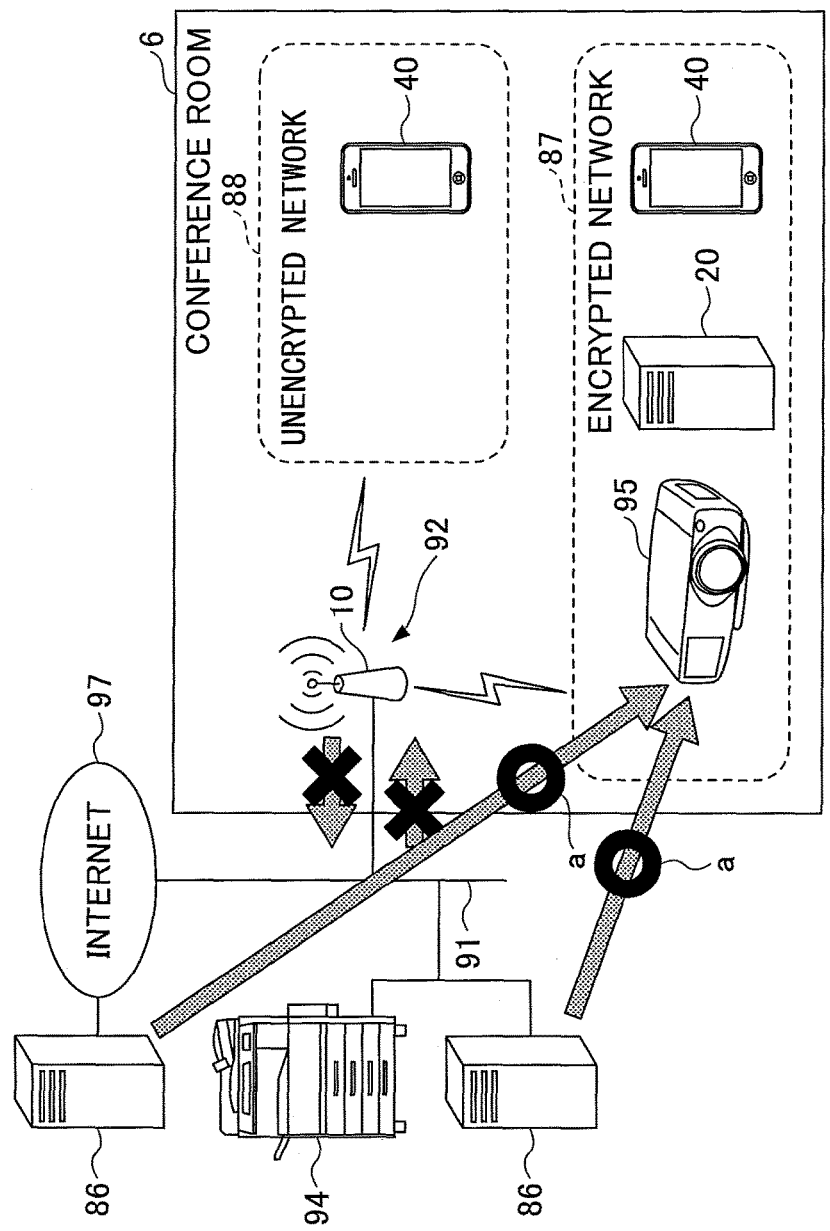
FIG. 20 is a schematic configuration diagram of a communication system according to an embodiment of the present invention (Example 3)

FIG. 20 is a schematic configuration diagram illustrating the communication system 100 in Example 3. Because a conference has been already held, the information terminal 40 can communicate with only such a device as registered in the device managing table among devices on the shared network 91. The device (projector 95 in FIG. 20) in Example 3 supports automatic updating of software. Further, an updating server 86 is present on the Internet or the conference network 92 and can transmit an updating program to the device.

While the conference is held, the network connection controlling device 10 in Example 3 permits communication between the device having an updating target and the updating server 86 (referenced at "a"). Accordingly, even while the conference is held, the device can update software.

not have an updating target. Accordingly, the network connection controlling device 10 can determine whether to permit communication by referring to the device managing table.

In addition, the device having the updating target periodically sends an inquiry about presence or absence of updating to the updating server 86. Accordingly, in Example 3, while the conference is held, devices registered in the device managing table are permitted to communicate with the shared network 91. Further, even if there is a firewall or the like between the conference room 6 and the updating server 86, the device having the updating target can communicate with the updating server 86.

Figure 21:
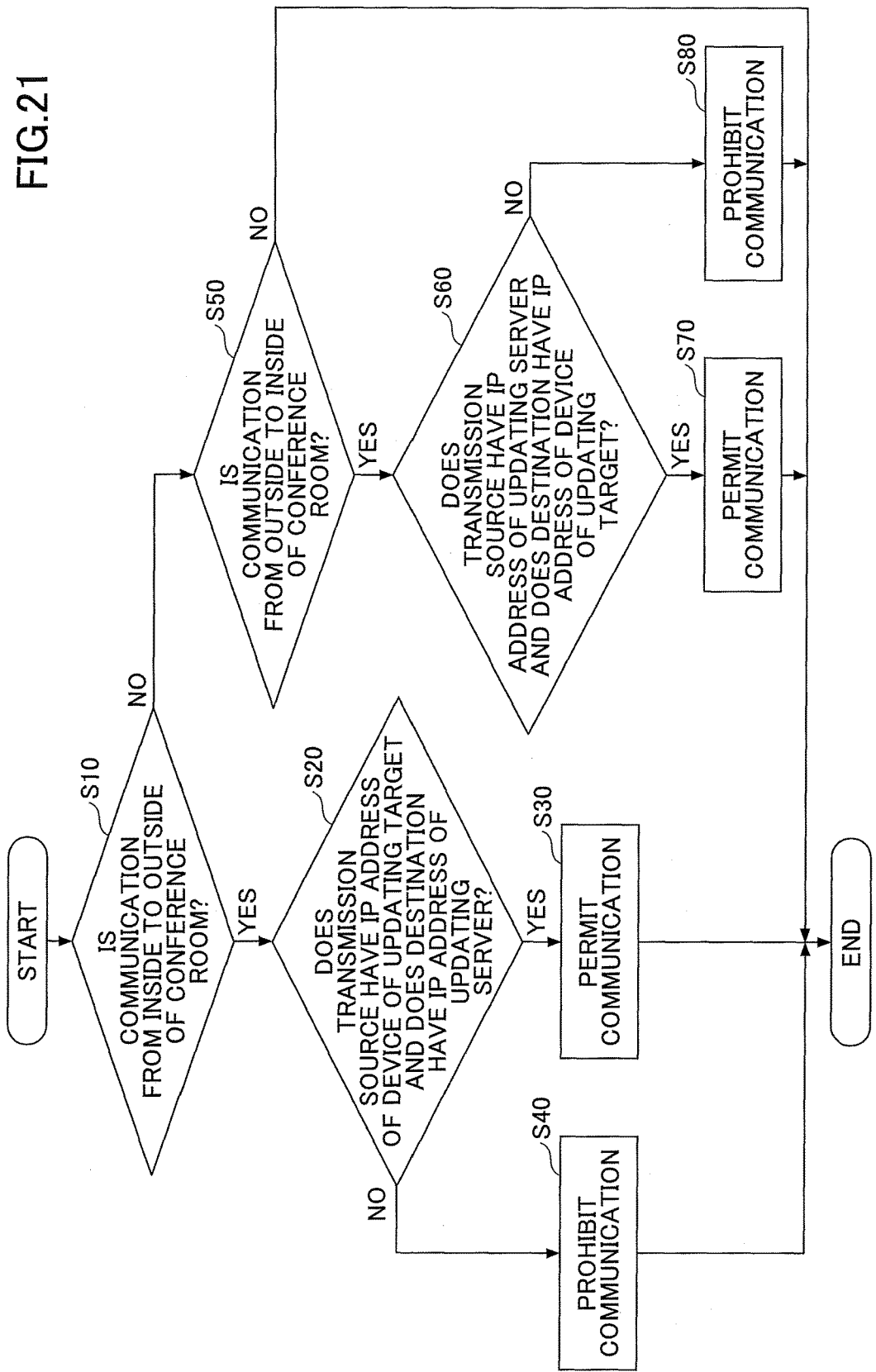
FIG. 21 is a flowchart depicting a procedure by which a network connection controlling device performs access control according to an embodiment of the present invention (Example 3)

FIG. 21 is a flowchart depicting a procedure by which the network connection controlling device 10 performs the access control in Example 3. It is assumed that the conference has been already held in FIG. 21.

The communication controlling unit 14 determines whether there is communication from the inside of the conference room 6 to the outside (S10).

If a result of the determination in step S10 is Yes, the communication controlling unit 14 refers to the device managing table to determine whether a transmission source has an IP address of a device having an updating target and a destination has an IP address of the updating server 86 (S20). In addition, the transmission source is determined to be Yes if the "Presence or absence of updating target" is "Present" in the device managing table.

If a result of the determination in step S20 is Yes, the communication controlling unit 14 permits communication (S30). If the result of the determination in step S20 is No, the communication controlling unit 14 prohibits communication (S40).

If the result of the determination in step S10 is No, the communication controlling unit 14 determines whether there is communication from the outside of the conference room 6 to the inside (S50).

If a result of the determination in step S50 is Yes, the communication controlling unit 14 refers to the device managing table to determine whether a transmission source has an IP address of the updating server 86 and a destination has an IP address of a device having an updating target (S60). In addition, the destination is determined to be Yes if the "Presence or absence of updating target" is "Present" in the device managing table.

TABLE 7

| Name | IP address | MAC address | Default gateway | Presence or absence of updating target | IP address of updating server |
|---|---|---|---|---|---|
| Print server | 192.168.10.1 | 102030405060 | 192.168.10.1/24 | Present | AAA.AAA.AAA.1 |
| MFP | 192.168.10.2 | 102030405061 | 192.168.10.1/24 | Present | AAA.AAA.AAA.2 |
| Whiteboard | 192.168.20.1 | 102030405062 | 192.168.20.1/24 | Present | AAA.AAA.AAA.3 |
| Projector | 192.168.20.2 | 102030405063 | 192.168.20.1/24 | Present | AAA.AAA.AAA.4 |

Table 7 indicates an example of the device managing table constituting the device managing DB 1001 of Example 3. A difference from Table 2 is mainly described. In the device managing table, names of devices, IP addresses, MAC addresses, default gateways, presence or absence of an updating target, and IP addresses of updating servers are registered in advance. As for the presence or absence of an updating target, "Present" indicates that the device has an updating target and "Absent" indicates that the device does If a result of the determination in step S60 is Yes, the communication controlling unit 14 permits communication (S70). If the result of the determination in step S60 is No, the communication controlling unit 14 prohibits communication (S80).

According to Example 3, it is possible to update the device while the conference is held. Accordingly, it is possible to eliminate the necessity to spare time for updating even if conferences are frequently held.

Example 4

In Example 4, the communication system 100 in which an application of the information terminal 40 can be updated while a conference is held is described.

Figure 22:
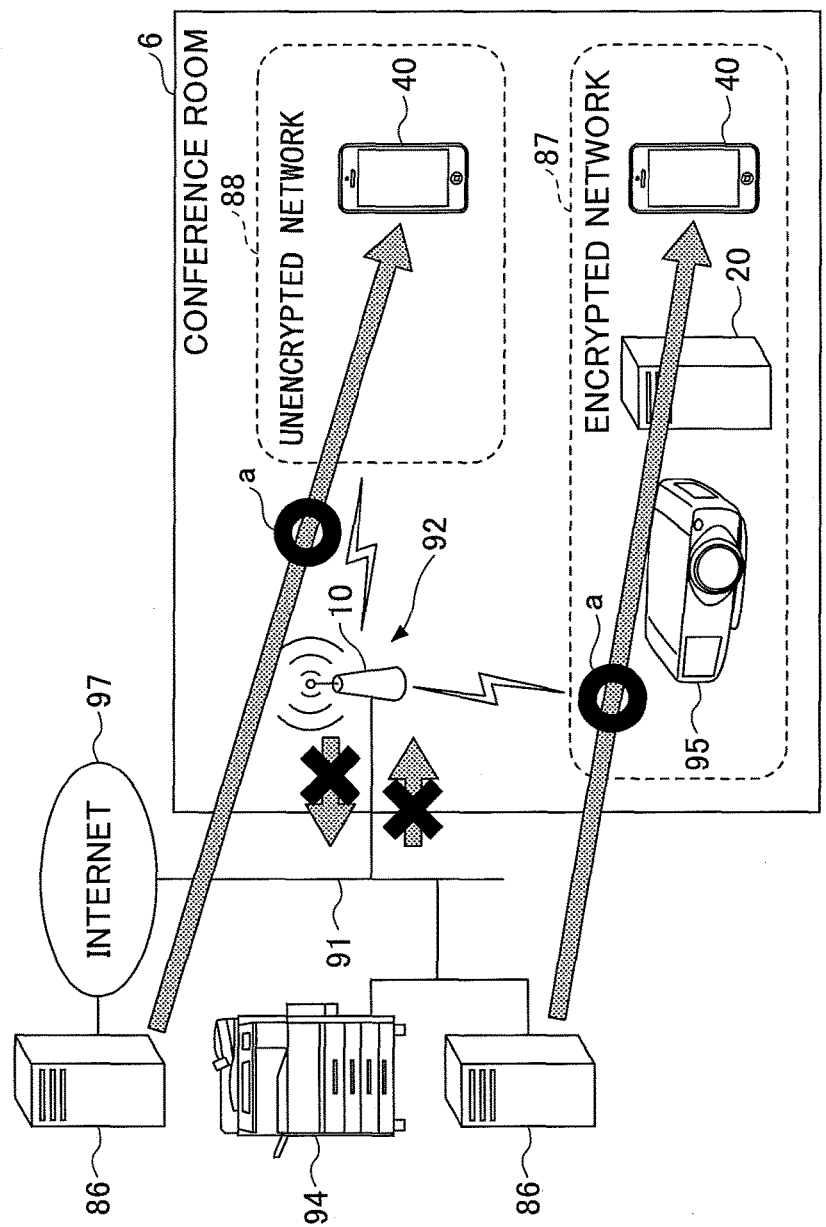
FIG. 22 is a schematic configuration diagram of a communication system according to an embodiment of the present invention (Example 4)

FIG. 22 is a schematic configuration diagram illustrating the communication system 100 in Example 4. Because a conference has been already held, the information terminal 40 can communicate with only such a device as registered in the device managing table among devices on the shared network 91. The application 4010 of the information terminal 40 may be updated for additional functions or improvement. Accordingly, the application 4010 of the information terminal 40 supports automatic updating. Further, the updating server 86 is present on the Internet or the conference network 92 and can transmit an updating program to the information terminal 40.

The network connection controlling device 10 in Example 4 permits communication between the information terminal 40 and the updating server 86 while the conference is held (referenced at "a"). Accordingly, the information terminal 40 can update the application 4010 even during the conference.

TABLE 8

| Application name | IP address of updating server |
|---|---|
| App 1 | AAA.AAA.AAA.5 |

Table 8 indicates an example of a server IP address table stored in the storage unit 1000 of the network connection controlling device 10. In the server IP address table, an application name and an IP address of the updating server 86 are registered. The network connection controlling device 10 refers to the server IP address table to determine whether to permit communication between the information terminal 40 and the updating server 86.

FIG. 23 is a flowchart depicting a procedure by which the network connection controlling device 10 performs the access control in Example 4. It is assumed that a conference has been already held in FIG. 23.

The communication controlling unit 14 determines whether there is communication from the inside of the conference room 6 to the outside (S10).

If a result of the determination in step S10 is Yes, the communication controlling unit 14 determines whether a transmission source has an IP address of the information terminal 40 and a destination has an IP address of the updating server (S20). The IP address of the information terminal 40 is registered in the participant information table. The IP address of the updating server 86 is registered in the server IP address table.

If a result of the determination in step S20 is Yes, the communication controlling unit 14 permits communication (S30). If the result of the determination in step S20 is No, the communication controlling unit 14 prohibits communication (S40).

If the result of the determination in step S10 is No, the communication controlling unit 14 determines whether there is communication from the outside of the conference room 6 to the inside (S50).

If a result of the determination in step S50 is Yes, the communication controlling unit 14 refers to the server IP address table to determine whether a transmission source has an IP address of the updating server 86 and refers to the participant information table to determine whether a destination has an IP address of the information terminal 40 (S60).

If a result of the determination in step S60 is Yes, the communication controlling unit 14 permits communication (S70). If the result of the determination in step S60 is No, the communication controlling unit 14 prohibits communication (S80).

According to Example 4, the information terminal 40 can update an application. Accordingly, an attendee can update the application to the latest version while the conference is held.

Other Application Examples

As mentioned above, the best mode to carry out the present invention is described using examples. However, the present invention is not limited at all to these examples. It is possible to add various types of modifications and replacements within the scope of the present invention.

For example, the configuration as illustrated in FIG. 6, for example, is divided based on main functions in order to facilitate understanding of processes performed by the conference managing device 20, the smart device 40a, and the network connection controlling device 10. The present invention is not limited by how a process unit is divided or a name. It is possible to divide the processes of the conference managing device 20, the smart device 40a, and the network connection controlling device 10 into more process units depending on a specific process. Further, it is possible to divide one process unit to include more processes.

Further, various types of databases stored in the storage unit 2000 and various types of databases stored in the storage unit 1000 in FIG. 6 may be present on one of the conference network 92 and the shared network 91.

A plurality of conference managing devices 20 or a plurality of network connection controlling devices 10 may be present. Functions of the conference managing device 20 or the network connection controlling device 10 may be dispersed and disposed in a plurality of servers.

The shared network 91 is an example of a first network. The conference network 92 is an example of a second network. The shared network 91 side is an example of a first network side. The conference network 92 side is an example of a second network side. The projector 95 and the electronic whiteboard 96 are examples of a second device. The updating server 86 is an example of a first device. The participant information table is an example of registration information. The connection with the network connection controlling device 10 by the report of holding of the conference or a device (information terminal 40) not registered in the device managing table is an example of a transition request. The wired communication unit 11 and the wireless communication unit 12 are examples of a transition request receiving unit. The communication controlling unit 14 is an example of a communication controller. The access control performed by the communication controlling unit 14 is an example of a communication controlling method. A state when a conference is held is an example of a communication controlled state. The wireless communication unit 12 is an example of a communication unit. The device managing table or the server IP address table is an example of registered identification information. The passcode is an example of authentication information. And the passcode checking unit 22 is an example of an authentication unit.

According to an embodiment of the present invention, it is possible to provide an information processing apparatus capable of enabling a terminal of a participant to communicate with a device outside a network and preventing deterioration of security.

Further, the present invention is not limited to these embodiments, and various variations and modifications may be made without departing from the scope of the present invention.

What is claimed is:

1. A system for connection to a first network and to a second network, the system comprising:
   a conference managing device; and
   a network connection controlling device,
   the conference managing device including,
   first memory storing first computer-executable instructions, and
   one or more first processors configured to execute the first computer-executable instructions such that the one or more first processors are configured to, store device information in which a first device connected to the first network is registered,
   authenticate an information terminal connected to the second network based on authentication information transmitted from the information terminal, and
   register identification information about the information terminal in registration information in response to successful authentication of the information terminal,
   the network connection controlling device including, second memory storing second computer-executable instructions, and one or more second processors configured to execute the second computer-executable instructions such that the one or more second processors are configured to, receive, from the second network, a request for transition to a communication controlled states,
   in response to receiving the request, transition to the communication controlled state, and in response to transitioning to the communication controlled state, restrict transmission of information from the second network to the first network while allowing the information terminal registered in the registration information to transmit information to the first device that is registered in the device information.

2. The system according to claim 1, wherein the one or more second processors are configured to execute the second computer-executable instructions such that, in response to transitioning to the communication controlled state, the one or more second processors refer to the device information in which identification information about the first device is registered and to the registration information, and with respect to communication from the second network to the first network, the or more second processors allow the information terminal to communicate with the first device if a destination is the first device registered in the device information and a transmission source is the information terminal registered in the registration information.

3. The system according to claim 1,
   wherein the second network includes an encrypted network and an unencrypted network, and wherein, the one or more second processors are configured to execute the second computer-executable instructions such that, in response to transitioning to the communication controlled state, the one or more second processors allow communication from the information terminal connected to the unencrypted network to the first device.

4. The system according to claim 3, wherein the one or more second processors are configured to execute the second computer-executable instructions such that, in response to detecting that the information terminal is connected to the unencrypted network before the transition to the communication controlled state, the one or more second processors restrict communication of the information terminal with an apparatus different from the first device registered in the device information and with a non-secure apparatus connected to the first network before the transition to the communication controlled state.

5. The system according to claim 4, wherein, the one or more second processors are configured to execute the second computer-executable instructions such that before the transition to the communication controlled state, the one or more second processors prohibit the information terminal from communicating with the Internet via the first network.

6. The system according to claim 4, wherein the one or more second processors are configured to execute the second computer-executable instructions such that, in response to detecting that the information terminal is connected to the encrypted network before the transition to the communication controlled state, the one or more second processors allow the information terminal to communicate with the Internet via the first network before the transition to the communication controlled state.

7. The system according to claim 5, wherein the one or more second processors are configured to execute the second computer-executable instructions such that, before the transition to the communication controlled state, the one or more second processors transmit screen information about a URL to the information terminal in response to, the information terminal connected to the unencrypted network sending a request for communication to the apparatus different from the first device registered in the device information, the information terminal sending the request for communication to the non-secure apparatus connected to the first network, or the information terminal sending the request for communication to the Internet.

8. The system according to claim 1, wherein the one or more second processors are configured to execute the second computer-executable instructions such that, the one or more second processors store registered identification information in which identification information about a first device connected to the first network and identification information about a second device connected to the second network are registered in an associated manner,
   in response to transitioning to the communication controlled state, the one or more second processors restrict transmission of information from the first network to the second network, and
   in response to a request for communication from the first network to the second network being detected in the communication controlled state, and a destination and a transmission source of the request for communication being registered in the registered identification information, the one or more second processors refer to the registered identification information and allow transmission of information from the first network to the second network.

9. The system according to claim 1, wherein the one or more second processors are configured to execute the second computer-executable instructions such that, the one or more second processors store registered identification information in which identification information about an information processing device connected to the first network is registered,
   in response to the transitioning to the communication controlled state, the one or more second processors restrict transmission of information from the first network to the second network, and in response to a request for communication from the first network to the second network being detected in the communication controlled state, a destination of the request for communication being registered in the registration information, and a transmission source of the request for communication being registered in the registered identification information, the one or more second processors refer to the registered identification information and allow transmission of information from the first network to the second network.

10. A non-transitory recording medium storing computer executable instructions that, when executed by one or more processors, cause the one or more processors to perform operations including: storing device information in which a first device connected to a first network is registered;

authenticating an information terminal connected to a second network based on authentication information transmitted from the information terminal and registering identification information about the information terminal in registration information in response to successful authentication of the information terminal;

receiving, from the second network, a request for transition to a communication controlled state;

in response to receiving the request, transitioning to the communication controlled state; and in response to transitioning to the communication controlled state, restricting transmission of information from the second network to the first network while allowing the information terminal registered in the registration information to transmit information to the first device that is registered in the device information.

11. A method for controlling communication performed by an information processing apparatus for connection to a first network and to a second network, the method for controlling communication comprising:

storing, by a conference managing device, device information in which a first device connected to the first network is registered;

authenticating, by the conference managing device, an information terminal connected to the second network based on authentication information transmitted from the information terminal and registering identification information about the information terminal in registration information in response to successful authentication of the information terminal;

receiving, by a network connection controlling device, from the second network, a request for transition to a communication controlled state;

in response to receiving the request, transitioning, by the network connection controlling device, to the communication controlled state; and in response to transitioning to the communication controlled state, restricting, by the network connection controlling device, transmission of information from the second network to the first network while allowing the information terminal registered in the registration information to transmit information to the first device that is registered in the device information.

12. The method for controlling communication according to claim 11, wherein, in response to transitioning to the communication controlled state, the network connection controlling device refers to the device information in which identification information about the first device is registered and to the registration information, and with respect to communication from the second network to the first network, the network connection controlling device allows the information terminal to communicate with the first device if a destination is the first device registered in the device information and a transmission source is the information terminal registered in the registration information.

13. The method for controlling communication according to claim 11, wherein the second network includes an encrypted network and an unencrypted network, and wherein, in response to transitioning to the communication controlled state, the network connection controlling device allows communication from the information terminal connected to the unencrypted network to the first device.

14. The method for controlling communication according to claim 13, further comprising: in response to detecting that the information terminal is connected to the unencrypted network before the transition to the communication controlled state, restricting, by the network connection controlling device, communication of the information terminal with an apparatus different from the first device registered in the device information and with a non-secure apparatus connected to the first network, before the transition to the communication controlled state.

15. The method for controlling communication according to claim 14, further comprising: before the transition to the communication controlled state, prohibiting, by the network connection controlling device, the information terminal from communicating with the Internet via the first network.

16. The method for controlling communication according to claim 14, wherein, in response to detecting that the information terminal is connected to the encrypted network before the transition to the communication controlled state, the network connection controlling device allows the information terminal to communicate with the Internet via the first network before the transition to the communication controlled state.

17. The method for controlling communication according to claim 15, wherein, before the transition to the communication controlled state, the network connection controlling device transmits screen information about a URL to the information terminal in response to, the information terminal connected to the unencrypted network sending a request for communication to the apparatus different from the first device registered in the device information, the information terminal sending the request for communication to the non-secure apparatus connected to the first network, or the information terminal sending the request for communication to the Internet.

18. The method for controlling communication according to claim 11, wherein the network connection controlling device stores registered identification information in which identification information about a first device connected to the first network and identification information about a second device connected to the second network are registered in an associated manner, wherein, in response to transitioning to the communication controlled state, the network connection controlling device restricts transmission of information from the first network to the second network, and wherein, in response to a request for communication from the first network to the second network being detected in the communication controlled state and a destination and a transmission source of the request for communication being registered in the registered identification information, the network connection controlling device refers to the registered identification information and allows transmission of information from the first network to the second network.

19. The method for controlling communication according to claim 11, wherein the network connection controlling device stores registered identification information in which identification information about an information processing device connected to the first network is registered,
- wherein, in response to transitioning to the communication controlled state, the network connection controlling device restricts transmission of information from the first network to the second network, and
- wherein, in response to a request for communication from the first network to the second network being detected in the communication controlled state, a destination of the request for communication being registered in the registration information, and a transmission source of the request for communication being registered in the registered identification information,
- the network connection controlling device refers to the registered identification information and allows transmission of information from the first network to the second network.

\* \* \* \* \*